United States Patent [19]
Takano et al.

[11] Patent Number: 5,887,125
[45] Date of Patent: Mar. 23, 1999

[54] IMAGE FORMING APPARATUS

[75] Inventors: Yukitoshi Takano; Mikio Koga; Megumi Yasuda; Yoshinori Wada; Mie Toyohara; Yoshikazu Yamamoto, all of Kawasaki, Japan

[73] Assignee: Fujitsu Limited, Kanagawa, Japan

[21] Appl. No.: 798,035

[22] Filed: Feb. 6, 1997

[30] Foreign Application Priority Data

Feb. 7, 1996 [JP] Japan ................................ 8-021035
Jan. 22, 1997 [JP] Japan ................................ 9-009809

[51] Int. Cl.[6] ................................................... H04N 1/50
[52] U.S. Cl. ............................ 395/111; 358/540; 347/116
[58] Field of Search ............................ 395/111, 109; 358/501, 540; 347/116; 399/301

[56] References Cited

U.S. PATENT DOCUMENTS

| | | | |
|---|---|---|---|
| 5,452,073 | 9/1995 | Kataoka ................................... | 347/116 |
| 5,550,625 | 8/1996 | Takamatsu et al. ...................... | 347/116 |
| 5,600,404 | 2/1997 | Ando et al. .............................. | 399/301 |
| 5,740,492 | 4/1998 | Deki et al. ............................... | 399/301 |
| 5,768,671 | 6/1998 | Komiya et al. .......................... | 399/301 |
| 5,778,280 | 7/1998 | Komiya et al. .......................... | 399/301 |

FOREIGN PATENT DOCUMENTS

| | | |
|---|---|---|
| 0319241 A | 6/1989 | European Pat. Off. . |
| 0435640 A | 7/1991 | European Pat. Off. . |
| 0575162 A | 12/1993 | European Pat. Off. . |
| 06155817 | 6/1994 | Japan . |

*Primary Examiner*—Scott Rogers
*Attorney, Agent, or Firm*—Armstrong, Westerman, Hattori, McLeland & Naughton

[57] ABSTRACT

An image forming apparatus includes a plurality of image bearing members bearing latent images, image forming units for forming the latent images on the image bearing members, developing units for developing the latent images on the image bearing members, a transport belt for transporting a transfer member on which images of different colors developed by the developing units are successively transferred as the transfer member is transported, and image pickup elements, arranged obliquely to a main scan direction of the image forming units and located on a downstream of a most downstream one of the image bearing members along a direction in which the transport belt transports the transfer member. The image pickup elements detect as image information transmitted or reflected light quantity distributions of regions which include marks transferred on the transport belt from the image bearing members. The image forming apparatus further includes a correction unit for detecting correction quantities from error quantities of marks transferred from the image bearing members other than a reference image bearing member with respect to a reference mark transferred from the reference image bearing member based on the image information detected by the image pickup elements, and correcting positions of the latent images formed on the image bearing members other than the reference image bearing member depending on the correction quantities.

36 Claims, 31 Drawing Sheets

CCD MARK    LASER BEAM

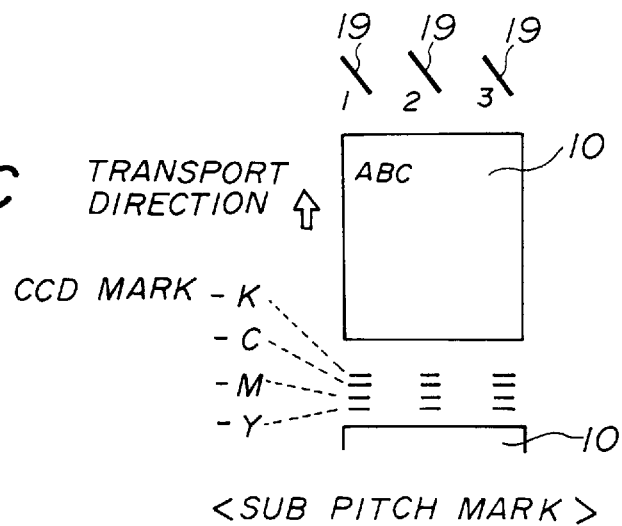
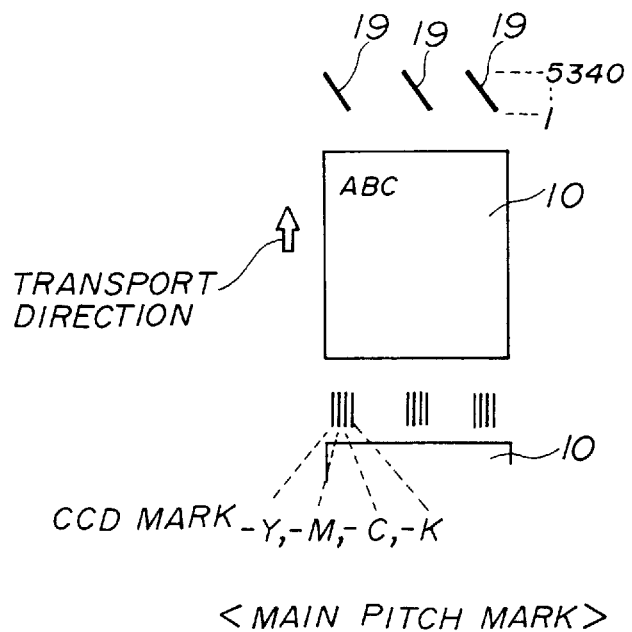

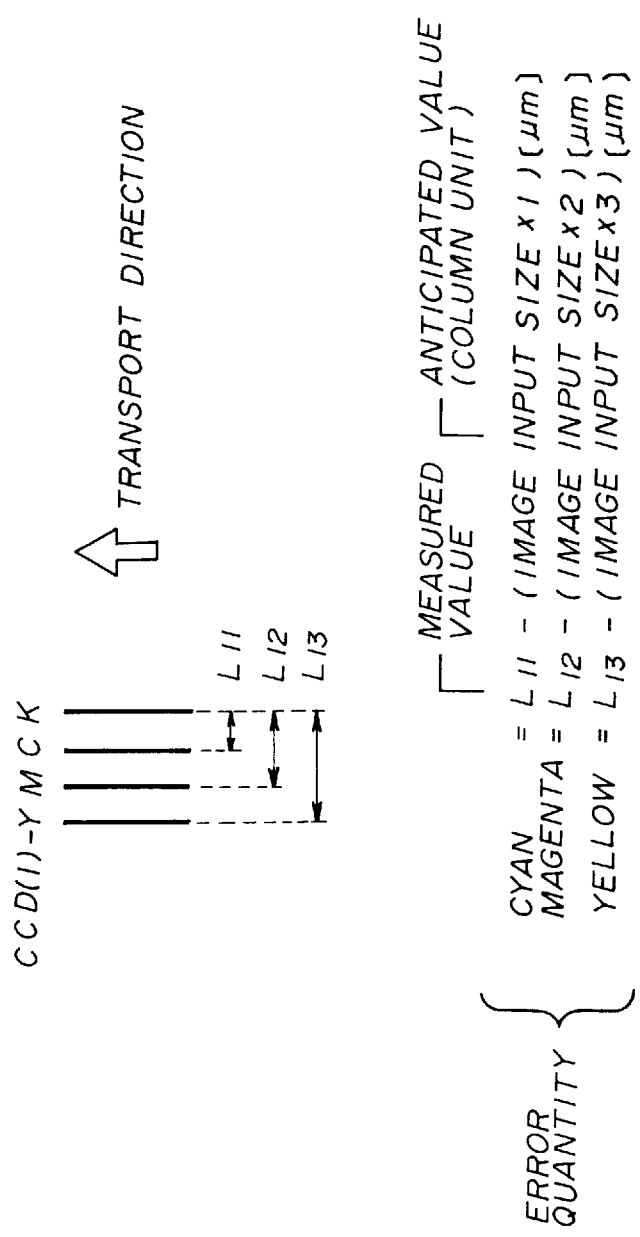

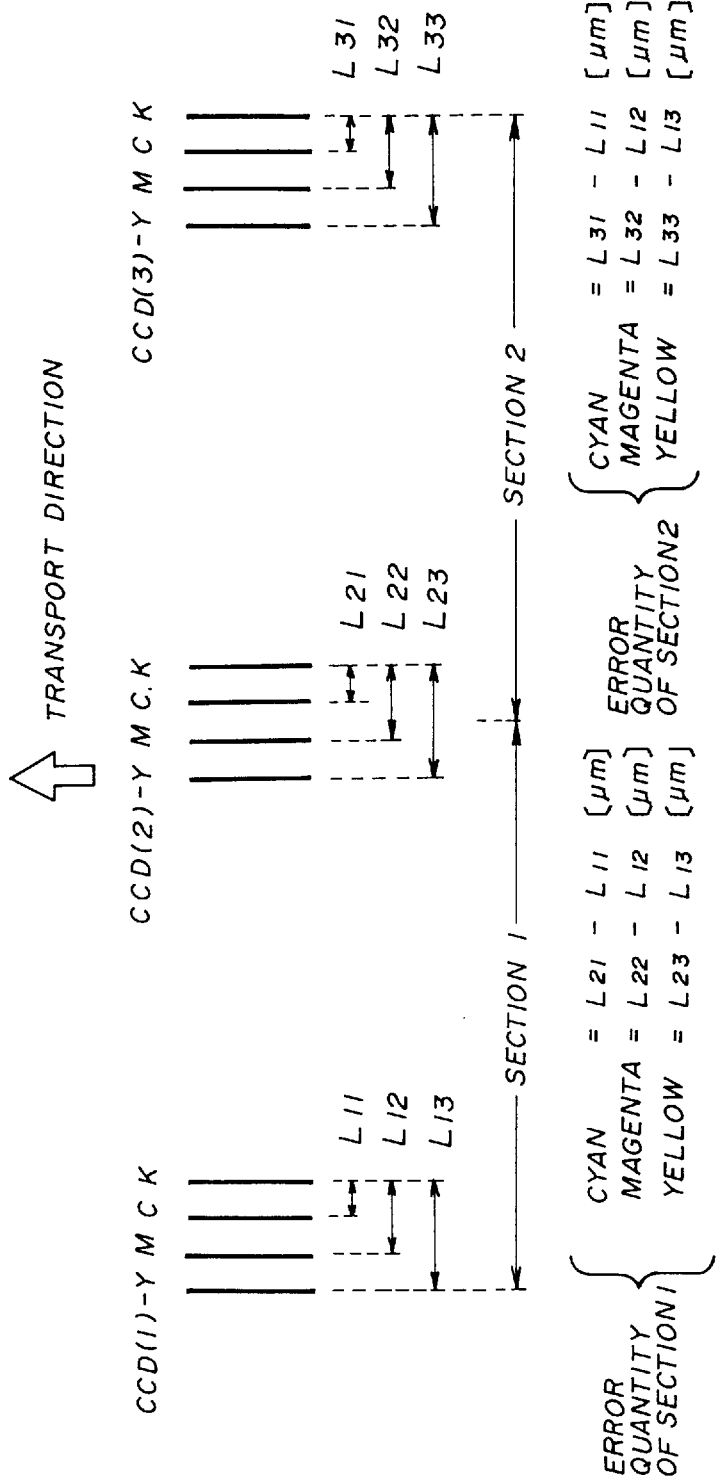

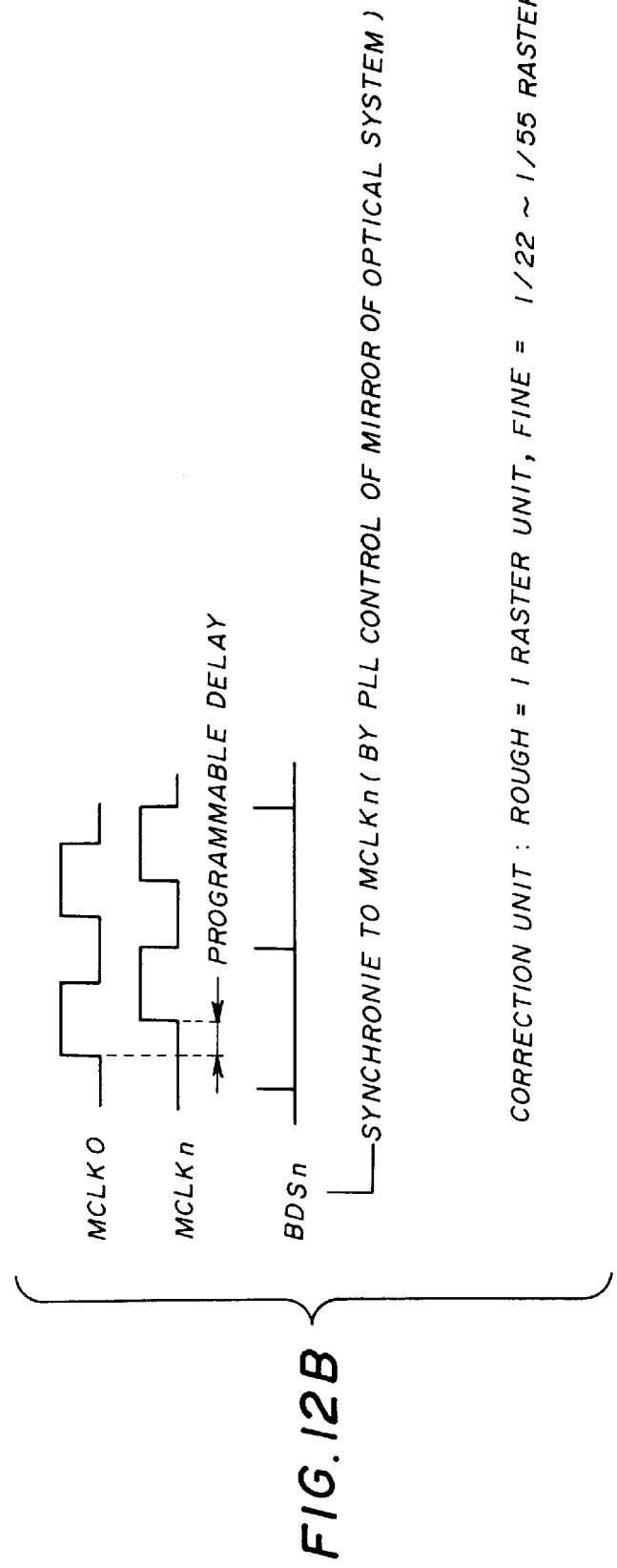

CORRECTION UNIT : ROUGH = 1 COLUMN UNIT,
FINE = 1 1/16 ~ 1/24 COLUMN UNIT

CORRECTION UNIT : FINE = 1/16 1/24 COLUMN UNIT

CHANGE (EXPAND) TO 25/24 PERIOD

CHANGE (COMPRESS) TO 23/24 PERIOD

IMAGE FORMING APPARATUS

BACKGROUND OF THE INVENTION

The present invention generally relates to image forming apparatuses, and more particularly to an image forming apparatus including a plurality of latent image bearing members on which latent images are formed and successively transferring images of different colors formed on the latent image bearing members onto the same transfer member such as a sheet of paper.

Conventionally, in a laser scan type recording apparatus which uses an optical scan system, a laser beam detector detects a scan start position of a laser beam, and reading of pixel information is started after receiving an output of the laser beam detector. The laser beam is modulated using the pixel information and a pixel clock, and the modulated laser beam is irradiated on a photoconductive body so as to form a toner latent image on the photoconductive body. The toner latent image is developed, and an image formation is made by transferring the developed image onto a recording medium.

The output of the laser beam detector and the pixel clock are physically not synchronized. For this reason, a deviation amounting to a maximum of 1 pixel clock may occur in the modulation start timing of the laser beam, thereby causing a pixel shear (or shift). Hence, there was a conventional image forming apparatus which detects the output of the laser beam detector using a clock having N times the frequency of the pixel clock, and then obtaining the pixel clock by frequency-dividing the detected output by 1/N. On the other hand, there was another conventional image forming apparatus which provides pixel clocks having N phases and detection circuits amounting to the number of phases, and obtaining the pixel clock based on the first clock phase detected from the output of the laser beam detector.

However, the conventional image forming apparatuses had the following problems to be solved.

First, in the laser scan system using a rotary polygonal mirror, an image scan width differed for each face of the polygonal mirror due to the different characteristics of the faces, such as the face irregularities or inclinations, the fΘ characteristics, the focal distances and the uniformness of velocities. As a result, with respect to an image on the scan ending side, a periodic image shear occurred in a sub scan direction which is perpendicular to a main scan direction depending on the number of faces of the polygonal mirror.

Second, in the image forming apparatus which arranges a plurality of recording units for the different colors and forms a multi-color image on the recording medium such as paper by overlapping transfers of different color pixel data onto the recording medium, the position of the laser beam detector and the characteristics of the polygonal mirror differ for each recording unit, and the causes for the image shear further increased.

SUMMARY OF THE INVENTION

Accordingly, it is a general object of the present invention is to provide a novel and useful image forming apparatus in which the problems described above are eliminated.

Another and more specific object of the present invention is to provide an image forming apparatus which carries out fine positioning in units of pixels, including rearrangement of pixels, so that a high quality image can be formed at a low cost by correcting an image shear.

Still another object of the present invention is to provide an image forming apparatus comprising a plurality of image bearing members bearing latent images, image forming means for forming the latent images on the image bearing members, developing means for developing the latent images on the image bearing members, transport means for transporting a transfer member on which images of different colors developed by the developing means are successively transferred as the transfer member is transported, image pickup elements, arranged obliquely to a main scan direction of the image forming means and located on a downstream of a most downstream one of the image bearing members along a direction in which the transport means transports the transfer member, where the image pickup elements detect as image information transmitted or reflected light quantity distributions of regions which include marks transferred on the transport means from the image bearing members, and correction means for detecting correction quantities from error quantities of marks transferred from the image bearing members other than a reference image bearing member with respect to a reference mark transferred from the reference image bearing member based on the image information detected by the image pickup elements, and correcting positions of the latent images formed on the image bearing members other than the reference image bearing member depending on the correction quantities. According to the image forming apparatus of the present invention, it is possible to read two kinds of marks in the main and sub scan directions by use of an inexpensive one-dimensional image pickup element without the use of a two-dimensional image pickup element.

A further object of the present invention is to provide the image forming apparatus described above, wherein the correction means comprises mark image read means including storage means and continuous pixel detection means, and the continuous pixel detection means successively reads light quantities of image information in units of pixels, detects a continuity of the pixels from a comparison result between the read light quantities and a reference light quantity, and stores in the storage means, as transition point pixel data, transition points where a transmitted or reflected light quantity changes from a large value to a small value or vice versa together with a type of each of the transition points, where the continuous pixel detection means includes filter means for detecting the continuity of the pixels independently for a continuity of large size pixels and a continuity of small size pixels. According to the image forming apparatus of the present invention, it is possible to further improve the accuracy with which the mark pixel region is extracted. As a result, even if the mark transferred on the transport means is partially missing or is thin, a result different from the actual mark width will not be calculated. In addition, even if foreign substances such as dust particles and dispersed toner powder due to incomplete mark transfer exist on the transport means, such foreign substances will not be erroneously recognized as a mark. For this reason, it is possible to effectively correct the print position error by carrying out the print position error correction based on the detected mark.

Other objects and further features of the present invention will be apparent from the following detailed description when read in conjunction with the accompanying drawings.

BRIEF DESCRIPTION OF THE DRAWINGS

FIGS. 7C and 7D are diagrams for explaining the arrangement of CCD image sensors;

FIG. 10 is a diagram for explaining an error of a main scan start position in the first embodiment;

FIG. 11 is a diagram for explaining an error of a main scan printing width in the first embodiment;

FIGS. 12A and 12B respectively are diagrams for explaining a start position correction in a sub scan direction in the first embodiment;

DESCRIPTION OF THE PREFERRED EMBODIMENTS

Figure 1:
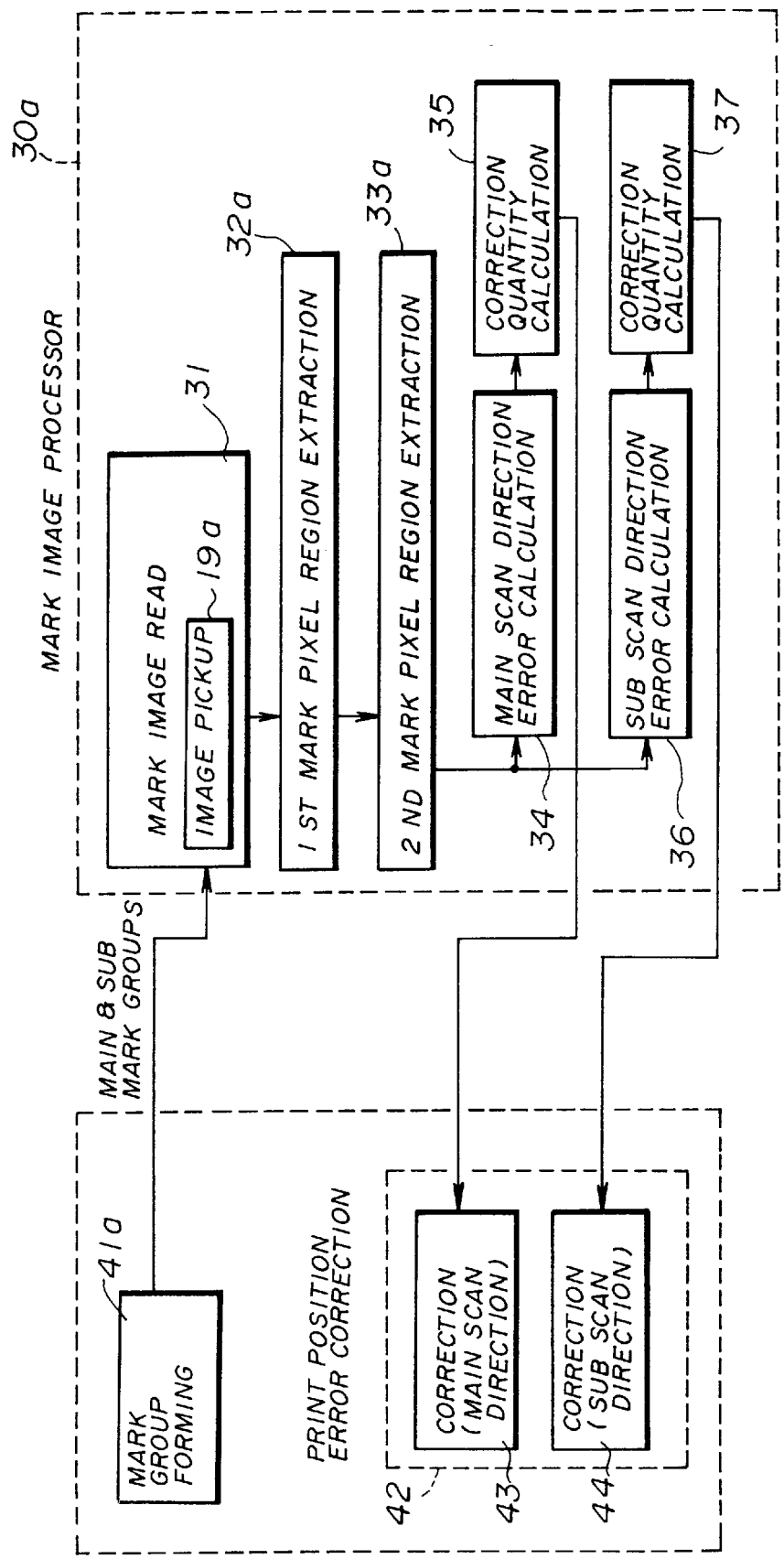
FIG. 1 is a system block diagram showing a part of a first embodiment of an image forming apparatus according to the present invention.

FIG. 1 shows a first embodiment of an image forming apparatus according to the present invention. In FIG. 1, a mark image processor 30a includes a mark image read unit 31 including an image pickup element 19a, a first mark pixel region extraction unit 32a, a second mark pixel region extraction unit 33a, a main scan direction error calculation unit 34, a correcting quantity calculation unit 35, a sub scan direction error calculation unit 36, and a correcting quantity calculation unit 37. On the other hand, a recording unit includes a mark group forming unit 41a, and a print position error correction unit 42 which includes correction units 43 and 44. The correction unit 43 corrects a start position and a printing width in a main scan direction, and the correction unit 44 corrects a start position and a printing width in a sub scan direction.

The present invention can be constructed as follows to solve the problems underlying the present invention.

(1) An image forming apparatus is constructed to include:
   a plurality of image bearing members bearing latent images;
   image forming means for forming the latent images on the image bearing members;
   developing means for developing the latent images on the image bearing members;
   transport means for transporting a transfer member on which images of different colors developed by the developing means are successively transferred as the transfer member is transported;
   image pickup elements 19a, arranged obliquely to a main scan direction of the image forming means and located on a downstream of a most downstream one of the image bearing members along a direction in which the transport means transports the transfer member, the image pickup elements 19a detecting as image information transmitted or reflected light quantity distributions of regions which include marks transferred on the transport means from the image bearing members; and
   correction means 42 for detecting correction quantities from error quantities of marks transferred from the image bearing members other than a reference image bearing member with respect to a reference mark transferred from the reference image bearing member based on the image information detected by the image pickup elements, and correcting positions of the latent images formed on the image bearing members other than the reference image bearing member depending on the correction quantities.

(2) The image forming apparatus described above under item (1) is further constructed so that, the image bearing members alternately transfer at least two kinds of mark groups on the transfer means in order to detect position errors in the main scan direction and a sub scan direction of the latent images formed on the image bearing members, the sub scan direction being perpendicular to the main scan direction.

(3) The image forming apparatus described above under item (1) is constructed to further include:
correction mode switching means for selectively switching between two correction modes including a first correction mode in which two or more kinds mark groups for detecting image position errors in the main and sub scan directions are alternately transferred on the transport means, and a second correction mode in which a continuous transfer is made on the transport means for every mark.

(4) The image forming apparatus described above under item (1) is constructed to further include:
means for detecting a continuity of a number of pixels by successively reading light quantities of the image information in units of pixels and comparing the read light quantities with a reference light quantity; and
means for storing transition points where values indicating the transmitted or reflected light quantities change from a large value to a small value or vice versa together with types of each of the transition points.

(5) The image forming apparatus described above under (4) is constructed to further include:
means for counting a number of times the transition points are detected by the image pickup elements 19a; and
means for invalidating the image information of a mark group if a counted value of the transition points after detection of the image information by the image pickup elements is completed falls outside a preset range.

(6) The image forming apparatus described above under item (4) is constructed to further include:
means for counting a number of times the transition points are detected by the image pickup elements 19a; and
means for adjusting a set value of the reference light quantity so that a counted value of the transition points after detection of the image information by the image pickup elements is completed falls within a preset range.

(7) The image forming apparatus described above under item (4) is constructed to further include:
means for detecting continuity of pixels of a large size and continuity of pixels of a small size.

(8) The image forming apparatus described above under item (4) is constructed to further include:
first means for detecting a large size pixel of a main mark portion;
second means for detecting a small size pixel of a mark edge portion; and
storage means for storing information including kinds of the large and small size pixels together, and the types of the transition points.

(9) The image forming apparatus described above under item (8) is constructed so that, the first means detects the large size pixel with reference to a value which is approximately 1/3 to 1/6 of a mark width, and the second means detects the small size pixel with reference to a value which is approximately 10 to 30 $\mu$m.

(10) The image forming apparatus described above under item (8) is constructed to further include:
first and second mark pixel region extraction means 32a, 33a for specifying positions of mark pixels by reading the information from the storage means,
the first mark pixel region extraction means 32a extracting a pixel region of the main mark portion,
the second mark pixel region extraction means 33a extracting a pixel region of the mark edge portion.

(11) The image forming apparatus described above under item (1) is constructed to further include:
means for calculating the correction quantities from a correspondence of a plurality of mark pixel regions extracted by the first and second mark pixel region extraction means 32a, 33a with a mark of a predetermined color.

(12) The image forming apparatus described above under item (11) is constructed to further include:
means for invalidating image information of the extracted mark group if a number of marks printed based on the print information does not match a number of mark pixel regions extracted by the first and second mark pixel region extraction means 32a, 33a.

(13) The image forming apparatus described above under item (10) is constructed so that, the first mark pixel region extraction means starts to refer to a large size pixel region in the data stored in the storage means, detects a portion of one mark pixel region from transition points and type included in the data that is first referred, and until a distance between a following large size pixel region and a previous pixel region exceeds a prescribed number of pixels, successively connects second and subsequent large size pixel regions which are next referred to the previous pixel region for replacement as a single pixel region.

(14) The image forming apparatus described above under item (10) is constructed so that, the second mark pixel region extraction means 33a starts to refer to a small size pixel region in the data in a reverse direction based on a transition point address of a leading edge of a mark pixel region extracted by the first mark pixel region extraction means 32a, and if the small size pixel region exists and until a distance between this small size pixel region and a previous pixel region exceeds a prescribed number of pixels, successively connects second and subsequent small size pixel regions which are next referred to the previous pixel region for replacement as a single pixel region.

(15) The image forming apparatus described above under item (10) is constructed so that, the second mark pixel region extraction means 33a starts to refer to a small size pixel region in the data in a forward direction based on a transition point address of a trailing edge of a mark pixel region extracted by the first mark pixel region extraction means 32a, and if the small size pixel region exists and until a distance between this small size pixel region and a previous pixel region exceeds a prescribed number of pixels, successively connects second and subsequent small size pixel regions which are next referred to the previous pixel region for replacement as a single pixel region.

(16) The image forming apparatus described above under item (10) is constructed to further include:
means for counting a number of data based on the mark pixel regions a corresponding color extracted by the first and second mark pixel region extraction means 32a, 33a, and comparing a counted value and a number of printed marks corresponding to the print information in response to a completion of the extraction by the first and second mark pixel region extraction means; and calculation means for calculating relative quantities of the marks of each color that are extracted and a reference mark color for a plurality of mark groups in response to a matching comparison result.

(17) The image forming apparatus described above under item (16) is constructed so that, the calculation means calculates the relative quantities are calculated based on a center of transition points of leading and trailing edges of the mark pixel region of each color.

(18) The image forming apparatus described above under item (16) is constructed to further include:

means for counting a number of times mark groups are extracted;

means for obtaining an average value of relative quantities amounting to the extracted number of mark groups for each color by excluding at least two values indicating maximum and minimum values when a counted value reaches a preset value; and means for calculating an error quantity between each color and a reference mark color based on the average value and a reference value, and calculating the correction quantity for each color based on the error quantity.

(19) The image forming apparatus described above under item (1) is constructed so that, the correction quantity used by the correction means 42 to correct a print start position error in the main scan direction is made up of a first correction value and a second correction value, the first correction value being in units of a printing density, the second correction value being in units of sections which are obtained by dividing the printing density, the second correction value being less than or equal to a number of sections and forming a delay.

(20) The image forming apparatus described above under item (1) is constructed so that, the correction quantity used by the correction means 42 to correct a print start position error in a sub scan direction is made up of a first correction value and a second correction value, the first correction value being in units of a printing density, the second correction value being in units of sections which are obtained by dividing the printing density, the second correction value being less than or equal to a number of sections and forming a delay, the sub scan direction being perpendicular to the main scan direction.

(21) The image forming apparatus described above under item (1) is constructed to further include:

means for dividing a print region into one or more sections in the main scan direction, and printing a mark group at start and terminal ends of each section, the mark group having marks of each of the colors arranged therein for detecting a position error;

the correction quantity used by the correction means with respect to a printing width to correct a print width error being formed solely by a value in units of sections which are obtained by dividing a printing density, when a number of each of the sections is two or greater, the correction means calculating the correction quantity of a first section depending on an error quantity of the first section, and calculating the correction quantity of a second and subsequent section by adding the correction quantity of a previous section to the correction quantity which is calculated from an error quantity of a present section.

(22) The image forming apparatus described above under item (1) is constructed to have an initial correction mode and a regular correction mode, wherein in the initial correction mode all correction operations being carried out by the correction means 42 regardless of a magnitude of the correction quantity, in the regular correction mode the correction operation being selectively carried out by the correction means 42 only when the correction quantity exceeds a prescribed value.

(23) The image forming apparatus described above under item (1) is constructed so that, the correction means comprises:

mark image read means including storage means and continuous pixel detection means, the continuous pixel detection means successively reading light quantities of image information in units of pixels, detecting a continuity of the pixels from a comparison result between the read light quantities and a reference light quantity, and storing in the storage means, as transition point pixel data, transition points where a transmitted or reflected light quantity changes from a large value to a small value or vice versa together with a type of each of the transition points, the continuous pixel detection means including filter means for detecting the continuity of the pixels independently for a continuity of large size pixels and a continuity of small size pixels.

(24) The image forming apparatus described above under item (23) is constructed so that, the continuous pixel detection means regards a continuity of the large size pixels as one mark by connecting the large size pixels in a range having a predetermined proportion to a width of the mark transferred on the transport means.

(25) The image forming apparatus described above under item (24) is constructed so that, the continuous pixel detection means invalidates the image information of the mark if a region between the transition points in the continuity of the connected large size pixels is less than or equal to the range having the predetermined proportion to the width of the mark transferred on the transport means.

(26) The image forming apparatus described above under item (24) is constructed so that, the continuous pixel detection means uses a continuity of the connected large size pixels as a reference region, and regards a continuity of the small size pixels existing in a vicinity of the reference region as a single mark by connecting the small size pixels in a range having a predetermined proportion to the width of the mark transferred on the transport means.

(27) The image forming apparatus described above under item (26) is constructed so that, the continuous pixel detection means invalidates the image information of the mark if a region between the transition points in the continuity of the connected large size pixels and a region between the transition points in the continuity of the connected small size pixels respectively are less than or equal to the range having the predetermined proportion to the width of the mark transferred on the transport means.

(28) The image forming apparatus described above under any of items (23) to (27) is constructed so that, the image forming means forms latent images of a plurality of marks on the image bearing members within a detectable range in which the image pickup elements can detect image information, and the mark image read means stores in the storage means pixel data of transition points with respect to the image information of the plurality of marks.

(29) The image forming apparatus described above under item (1) is constructed to further include:
non-volatile memory means,
the correction means carrying out the correction at a predetermined correction timing and storing the correction quantities used for the correction in the non-volatile memory means.

(30) The image forming apparatus described above under item (29) is constructed so that, the correction means determines the predetermined correction timing based on a number of transfer members printed.

(31) The image forming apparatus described above under item (29) is constructed so that, the correction means determines the predetermined correction timing based on a running time of the image forming apparatus measured by a timer.

(32) The image forming apparatus described above under item (29) is constructed so that, the correction means determines the predetermined correction timing based on conditions of use of the image forming apparatus.

(33) The image forming apparatus described above under item (32) is constructed so that, the correction means determines the predetermined correction timing based on at least one of a combination of the plurality of image bearing members used, a number of image bearing members used, and a resolution of the image bearing members.

(34) The image forming apparatus described above under any of items (29) to (33) is constructed so that, the correction means obtains the correction quantities based on an initial correction quantity prestored in the non-volatile memory means.

(35) The image forming apparatus described above under any of items (29) to (34) is constructed so that, the correction means stores the correction quantities in the non-volatile memory means for every condition of use of the image forming apparatus.

(36) The image forming apparatus described above under any of items (29) to (35) is constructed so that, the correction means stores a correction timing in the non-volatile memory means, and calculates a next correction timing based on a past correction timing and correction quantities read from the non-volatile memory means.

A description will be given of the functions realized by the constructions of the image forming apparatus described above under items (1) to (36).

The image forming apparatus is constructed to include: image pickup elements 19a, arranged obliquely to a main scan direction of the image forming means and located on a downstream of a most downstream one of the image bearing members along a direction in which the transport means transports the transfer member, the image pickup elements 19a detecting as image information transmitted or reflected light quantity distributions of regions which include marks transferred on the transport means from the image bearing members; and correction means 42 for detecting correction quantities from error quantities of marks transferred from the image bearing members other than a reference image bearing member with respect to a reference mark transferred from the reference image bearing member based on the image information detected by the image pickup elements, and correcting positions of the latent images formed on the image bearing members other than the reference image bearing member depending on the correction quantities. For this reason, it is possible to read two kinds of marks in the main and sub scan directions by use of an inexpensive one-dimensional image pickup element 19a without the use of a two-dimensional image pickup element.

The image forming apparatus may be constructed so that, the image bearing members alternately transfer at least two kinds of mark groups on the transfer means in order to detect position errors in the main scan direction and a sub scan direction of the latent images formed on the image bearing members. In this case, the correction quantities for the main and sub scan directions are successively obtained, thereby making it possible to simultaneously correct the print position errors in the main and sub scan directions by the correction means 42.

The image forming apparatus may be constructed to include correction mode switching means for selectively switching between two correction modes including a first correction mode in which two or more kinds mark groups for detecting image position errors in the main and sub scan directions are alternately transferred on the transport means, and a second correction mode in which a continuous transfer is made on the transport means for every mark. In this case, the mark groups for detecting the image position errors in the main and sub scan directions are first alternately printed, and if only one of the obtained image position errors falls within a prescribed value, it is possible to obtain the error quantity by continuously printing only the corresponding marks, thereby making it possible to reduce the time required to correct the error quantity.

The image forming apparatus may be constructed to further include: means for detecting a continuity of a number of pixels by successively reading light quantities of the image information in units of pixels and comparing the read light quantities with a reference light quantity; and means for storing transition points where values indicating the transmitted or reflected light quantities change from a large value to a small value or vice versa together with types of each of the transition points. In this case, it is possible to compress and store the data by extracting only the pixels having a predetermined width or greater.

The image forming apparatus may be constructed to further include: means for counting a number of times the transition points are detected by the image pickup elements 19a; and means for invalidating the image information of a mark group if a counted value of the transition points after detection of the image information by the image pickup elements is completed falls outside a preset range. In this case, it is possible to improve the extraction accuracy of the mark pixel region by eliminating extracted mark pixel region as a burst mark defect (blur of the mark or dust particles) if the number of compressed data falls outside a prescribed value.

The image forming apparatus may be constructed to further include: means for counting a number of times the transition points are detected by the image pickup elements 19a; and means for adjusting a set value of the reference light quantity so that a counted value of the transition points after detection of the image information by the image pickup elements is completed falls within a preset range. In this case, by switching the set value so that the set value decreases if the counted value exceeds the prescribed value and the set value increases if the counted value is smaller than the set value, it is possible to eliminate the effects caused by the changes in the mark tone and transmittance of the belt-shaped transport means (stains on the belt).

The image forming apparatus may be constructed to further include means for detecting continuity of pixels of a large size and continuity of pixels of a small size. In this case, by extracting pixel groups made up of the main mark portion and the mark edge portion of the large/small size pixels and connecting the pixel groups, it is possible to extract the mark region with a high accuracy even if the mark is partially missing or is thin.

The image forming apparatus may be constructed to further include: first means for detecting a large size pixel of a main mark portion; second means for detecting a small size pixel of a mark edge portion; and storage means for storing information including kinds of the large and small size pixels together, and the types of the transition points. In this case, by extracting pixel groups made up of the main mark portion and the mark edge portion of the large/small size pixels and connecting the pixel groups, it is possible to extract the mark region with a high accuracy even if the mark is partially missing or is thin.

The image forming apparatus may be constructed so that the first means detects the large size pixel with reference to a value which is approximately ⅓ to ⅙ of a mark width, and the second means detects the small size pixel with reference to a value which is approximately 10 to 30 $\mu$m. In this case, by extracting pixel groups made up of the main mark portion and the mark edge portion of the large/small size pixels and connecting the pixel groups, it is possible to extract the mark region with a high accuracy even if the mark is partially missing or is thin.

The image forming apparatus may be constructed to further include first and second mark pixel region extraction means 32a, 33a for specifying positions of mark pixels by reading the information from the storage means, the first mark pixel region extraction means 32a extracting a pixel region of the main mark portion, the second mark pixel region extraction means 33a extracting a pixel region of the mark edge portion. In this case, it is possible to extract the mark region with a high accuracy even if the mark is partially missing or is thin.

The image forming apparatus may be constructed to further include means for calculating the correction quantities from a correspondence of a plurality of mark pixel regions extracted by the first and second mark pixel region extraction means 32a, 33a with a mark of a predetermined color. In this case, if a reference color black and at least one other color are used, for example, it is possible to correction the print position error depending on the colors used, and the print position error can be corrected without the use of all of the colors even while an on-line printing is being made.

The image forming apparatus may be constructed to further include means for invalidating image information of the extracted mark group if a number of marks printed based on the print information does not match a number of mark pixel regions extracted by the first and second mark pixel region extraction means 32a, 33a. In this case, if a foreign substance corresponding to the missing mark or the pixel width of the main mark portion is adhered on the transport means, such a foreign substance can be removed from the mark based on the print information.

The image forming apparatus may be constructed so that the first mark pixel region extraction means starts to refer to a large size pixel region in the data stored in the storage means, detects a portion of one mark pixel region from transition points and type included in the data that is first referred, and until a distance between a following large size pixel region and a previous pixel region exceeds a prescribed number of pixels, successively connects second and subsequent large size pixel regions which are next referred to the previous pixel region for replacement as a single pixel region. In this case, by the connection process of the first mark pixel region extraction means 32a, it is possible to extract the mark region with a high accuracy even if the mark is partially missing or is thin.

The image forming apparatus may be constructed so that the second mark pixel region extraction means 33a starts to refer to a small size pixel region in the data in a reverse direction based on a transition point address of a leading edge of a mark pixel region extracted by the first mark pixel region extraction means 32a, and if the small size pixel region exists and until a distance between this small size pixel region and a previous pixel region exceeds a prescribed number of pixels, successively connects second and subsequent small size pixel regions which are next referred to the previous pixel region for replacement as a single pixel region. In this case, by the connection process of the second mark pixel region extraction means 33a, it is possible to extract the mark region with a high accuracy even if the mark is partially missing or is thin.

The image forming apparatus may be constructed so that the second mark pixel region extraction means 33a starts to refer to a small size pixel region in the data in a forward direction based on a transition point address of a trailing edge of a mark pixel region extracted by the first mark pixel region extraction means 32a, and if the small size pixel region exists and until a distance between this small size pixel region and a previous pixel region exceeds a prescribed number of pixels, successively connects second and subsequent small size pixel regions which are next referred to the previous pixel region for replacement as a single pixel region. In this case, by the connection process of the second mark pixel region extraction means 33a, it is possible to extract the mark region with a high accuracy even if the mark is partially missing or is thin.

The image forming apparatus may be constructed to further include: means for counting a number of data based on the mark pixel regions a corresponding color extracted by the first and second mark pixel region extraction means 32a, 33a, and comparing a counted value and a number of printed marks corresponding to the print information in response to a completion of the extraction by the first and second mark pixel region extraction means; and calculation means for calculating relative quantities of the marks of each color that are extracted and a reference mark color for a plurality of mark groups in response to a matching comparison result. In this case, by the connection process of the second mark pixel region extraction means 33a, it is possible to extract the mark region with a high accuracy even if the mark is partially missing or is thin.

The image forming apparatus may be constructed so that the calculation means calculates the relative quantities are calculated based on a center of transition points of leading and trailing edges of the mark pixel region of each color. In this case, it is possible to accurately measure the distances of the marks even if fluctuations such as thinning of the mark width occurs.

The image forming apparatus may be constructed to further include: means for counting a number of times mark groups are extracted; means for obtaining an average value of relative quantities amounting to the extracted number of mark groups for each color by excluding at least two values indicating maximum and minimum values when a counted value reaches a preset value; and means for calculating an error quantity between each color and a reference mark color based on the average value and a reference value, and calculating the correction quantity for each color based on the error quantity. In this case, it is possible to suppress the effects of the burst mark deflects to a minimum.

The image forming apparatus may be constructed so that the correction quantity used by the correction means 42 to correct a print start position error in the main scan direction is made up of a first correction value and a second correction value, the first correction value being in units of a printing density, the second correction value being in units of sections which are obtained by dividing the printing density, the second correction value being less than or equal to a number of sections and forming a delay. In this case, the error of the print start position in the main can direction can be finely adjusted in units of 1/N by the second correction value, and this adjusting quantity can be set as it is in a delay timer by allowing only a delay (positive). As a result, it is possible to carry out in one process all of the various computation processes which vary depending on the printing density or the like.

The image forming apparatus may be constructed so that the correction quantity used by the correction means 42 to correct a print start position error in a sub scan direction is made up of a first correction value and a second correction value, the first correction value being in units of a printing density, the second correction value being in units of sections which are obtained by dividing the printing density, the second correction value being less than or equal to a number of sections and forming a delay, the sub scan direction being perpendicular to the main scan direction. In this case, the error of the print start position in the main can direction can be finely adjusted in units of 1/N by the second correction value, and this adjusting quantity can be set as it is in a delay timer by allowing only a delay (positive). As a result, it is possible to carry out in one process all of the various computation processes which vary depending on the printing density or the like.

The image forming apparatus may be constructed to further include means for dividing a print region into one or more sections in the main scan direction, and printing a mark group at start and terminal ends of each section, the mark group having marks of each of the colors arranged therein for detecting a position error, where the correction quantity used by the correction means with respect to a printing width to correct a print width error being formed solely by a value in units of sections which are obtained by dividing a printing density, and when a number of each of the sections is two or greater, the correction means calculating the correction quantity of a first section depending on an error quantity of the first section, and calculating the correction quantity of a second and subsequent section by adding the correction quantity of a previous section to the correction quantity which is calculated from an error quantity of a present section. In this case, when the correction operation is carried out based on the error correction quantity of the previous section, it is possible to obtain the error correction quantity of the next section by taking into consideration the change occurring in the error quantity of the next section. As a result, it is possible to simultaneously carry out the operation of correcting the printing width in all of the sections, thereby reducing the processing time.

The image forming apparatus may be constructed to have an initial correction mode and a regular correction mode, wherein, in the initial correction mode all correction operations being carried out by the correction means 42 regardless of a magnitude of the correction quantity, and in the regular correction mode the correction operation being selectively carried out by the correction means 42 only when the correction quantity exceeds a prescribed value. As a result, at the time when the power of the image forming apparatus is turned ON or the image forming apparatus is activated again after being activated for a time exceeding a predetermined time, all of the correction operations are carried out by the correction means 42 even if the error quantity is a predetermined value or less. When the image forming apparatus is activated, the error quantity is appropriately detected by recording the marks on the transport means between the successive transfer members, only if the error quantity exceeds the predetermined value. For this reason, it is possible to maintain the print position error caused by inconsistencies among the individual image forming apparatuses and external disturbances such as that caused by temperature change to a predetermined value or less.

The image forming apparatus may be constructed so that the correction means comprises mark image read means including storage means and continuous pixel detection means, where the continuous pixel detection means successively reads light quantities of image information in units of pixels, detecting a continuity of the pixels from a comparison result between the read light quantities and a reference light quantity, and stores in the storage means, as transition point pixel data, transition points where a transmitted or reflected light quantity changes from a large value to a small value or vice versa together with a type of each of the transition points, the continuous pixel detection means including filter means for detecting the continuity of the pixels independently for a continuity of large size pixels and a continuity of small size pixels. As a result, even if the mark transferred on the transport means is partially missing or is thin, the calculated result will not be different from the actual mark width. In addition, even if foreign substances such as dust particles and dispersed toner powder due to incomplete mark transfer exist on the transport means, such foreign substances will not be erroneously recognized as marks. Therefore, it is possible to effectively correct the print position error by carrying out the print position error correction based on the detected marks.

The image forming apparatus may be constructed so that the continuous pixel detection means regards a continuity of the large size pixels as one mark by connecting the large size pixels in a range having a predetermined proportion to a width of the mark transferred on the transport means. In this case, the marks can be detected accurately.

The image forming apparatus may be constructed so that the continuous pixel detection means invalidates the image information of the mark if a region between the transition points in the continuity of the connected large size pixels is less than or equal to the range having the predetermined proportion to the width of the mark transferred on the transport means. In this case, it is possible to prevent foreign substances such as dust particles from being erroneously recognized as marks.

The image forming apparatus may be constructed so that the continuous pixel detection means uses a continuity of the connected large size pixels as a reference region, and regards a continuity of the small size pixels existing in a vicinity of the reference region as a single mark by connecting the small size pixels in a range having a predetermined proportion to the width of the mark transferred on the transport means. In this case, it is possible to accurately detect the marks.

The image forming apparatus may be constructed so that the continuous pixel detection means invalidates the image information of the mark if a region between the transition points in the continuity of the connected large size pixels and a region between the transition points in the continuity of the connected small size pixels respectively are less than or equal to the range having the predetermined proportion to the width of the mark transferred on the transport means. In this case, it is possible to prevent foreign substances such as dust particles from being erroneously recognized as marks.

The image forming apparatus may be constructed so that the image forming means forms latent images of a plurality of marks on the image bearing members within a detectable range in which the image pickup elements can detect image information, and the mark image read means stores in the storage means pixel data of transition points with respect to the image information of the plurality of marks. In this case, it is possible to positively correct the print position error by controlling each image forming means using the transition point pixel data.

The image forming apparatus may be constructed to further include non-volatile memory means, where the correction means carries out the correction at a predetermined correction timing and storing the correction quantities used for the correction in the non-volatile memory means. In this case, it is possible to shorten the correction process by preventing unnecessary correction operations.

The image forming apparatus may be constructed so that the correction means determines the predetermined correction timing based on a number of transfer members printed. In this case, it is possible to carry out the correction process at an optimum timing.

The image forming apparatus may be constructed so that the correction means determines the predetermined correction timing based on a running time of the image forming apparatus measured by a timer. In this case, it is possible to carry out the correction process at an optimum timing.

The image forming apparatus may be constructed so that the correction means determines the predetermined correction timing based on conditions of use of the image forming apparatus. In this case, it is possible to carry out the correction process at an optimum timing suited for the conditions of use.

The image forming apparatus may be constructed so that the correction means determines the predetermined correction timing based on at least one of a combination of the plurality of image bearing members used, a number of image bearing members used, and a resolution of the image bearing members. In this case, it is possible to carry out the correction process at an optimum timing suited for the conditions of use.

The image forming apparatus may be constructed so that the correction means obtains the correction quantities based on an initial correction quantity prestored in the non-volatile memory means. In this case, it is possible to minimize the correction operation and reduce the time that is required by the correction process.

The image forming apparatus may be constructed so that the correction means stores the correction quantities in the non-volatile memory means for every condition of use of the image forming apparatus. In this case, it is possible to minimize the correction operation and reduce the time that is required by the correction process.

The image forming apparatus may be constructed so that, the correction means stores a correction timing in the non-volatile memory means, and calculates a next correction timing based on a past correction timing and correction quantities read from the non-volatile memory means. In this case, it is possible to efficiently carry out the correction process.

A more detailed description will be given of the first embodiment of the image forming apparatus according to the present invention, by referring to FIGS. 2 through 15.

1) Description of Image Forming Apparatus

Figure 2:
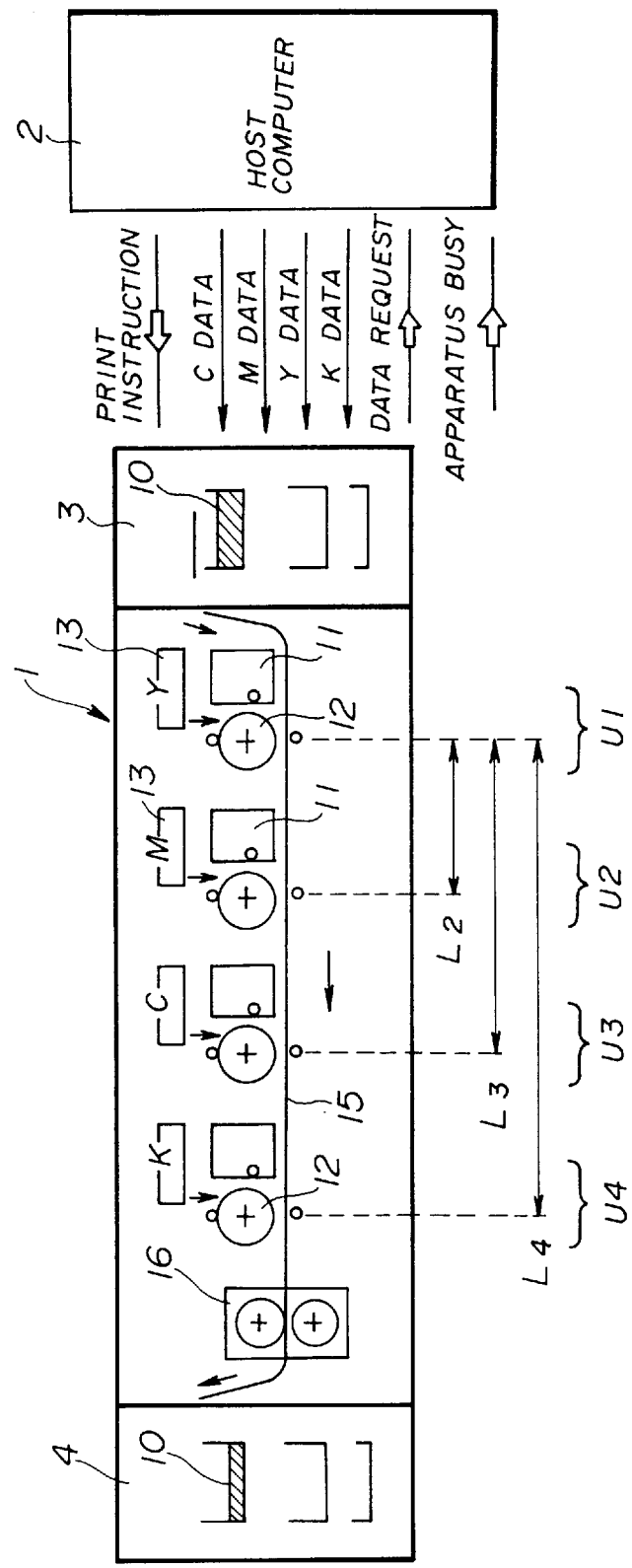
FIG. 2 is a diagram generally showing the first embodiment of the image forming apparatus.

FIG. 2 generally shows the first embodiment of the image forming apparatus. An image forming apparatus 1 shown in FIG. 2 includes recording units U1 through U4, a hopper 3, a stacker 4, a transport path 15 for transporting recording sheets 10, and a fixing unit 16. Each of the recording units U1 through U4 includes a developing unit 11, a photoconductive (or OPC: Organic Photoconductive) drum 12, and an optical unit 13.

The recording unit U1 has a yellow (hereinafter simply referred to as Y) developing unit 11, a photoconductive drum 12 and an optical unit 13. The recording unit U2 has a magenta (hereinafter simply referred to as M) developing unit 11, a photoconductive drum 12 and an optical unit 13. The recording unit U3 has a cyan (hereinafter simply referred to as C) developing unit 11, a photoconductive drum 12 and an optical unit 13. In addition, the recording unit U4 has a black (hereinafter simply referred to as K) developing unit 11, a photoconductive drum 12 and an optical unit 13.

The hopper 3 is provided supply recording sheets 10 to the transport path 15. The stacker 4 is provided to stack the recording sheets 10 on which the recording (printing) has been made. The transport path 15 transports the recording sheets 10 on which the images are to be recorded. The fixing unit 16 fixes the image which is transferred from each photoconductive drum 12 onto the recording sheet 10.

The developing unit 11 develops a latent image formed on the photoconductive drum 12 by applying a developing agent (toner corresponding to a corresponding one of Y, M, C and K recording units U1 through U4). The photoconductive drum 12 transfers the image which is developed by the developing unit 11 onto the recording sheet 10. The optical unit 13 forms the latent image on the photoconductive drum 12 by scanning the photoconductive drum 12 by a laser beam which is modulated by image data (information) corresponding to one of Y, M, C and K recording units U1 through U4 to which the optical unit 13 belongs.

In response to a print instruction received from a host computer 2, the image forming apparatus 1 sends an apparatus busy signal to the host computer 2 if print preparations are not completed in the image forming apparatus 1. On the other hand, if the print preparations are completed, the image forming apparatus 1 makes a data request to the host computer 2 in response to the print instruction. When Y data, M data, C data and K data are received from the host computer 2, the recording units U1 through U4 of the image forming apparatus 1 form latent images on the corresponding photoconductive drums 12 by scanning the photoconductive drums 12 by laser beams which are modulated by the Y, M, C and K data in the corresponding optical units 1. The latent images formed on the photoconductive drums 12 of the recording units U1 through U4 are developed by applying the developing agents to the latent images in the corresponding developing units 11.

The recording sheets 10 are supplied one sheet at a time from the hopper 3 to the transport path 15, and a belt-shaped transport means transports each recording sheet 10. As the recording sheet 10 is transported on the belt-shaped transport means, the photoconductive drums 12 of the recording units U1 through U4 successively transfer the developed images of the corresponding colors onto the recording sheet 10 in an overlapping manner, and the fixing unit 16 fixes the overlapping images on the recording sheet 10. Finally, the printed recording sheets 10 are successively stacked on the stacker 4. In FIG. 2, $L_2$ denotes a distance from the recording unit U1 to the recording unit U2, $L_3$ denotes a distance from the recording unit U1 to the recording unit U3, and $L_4$ denotes a distance from the recording unit U1 to the recording unit U4.

2) Description of Controller of Image Forming Apparatus

Figure 3:
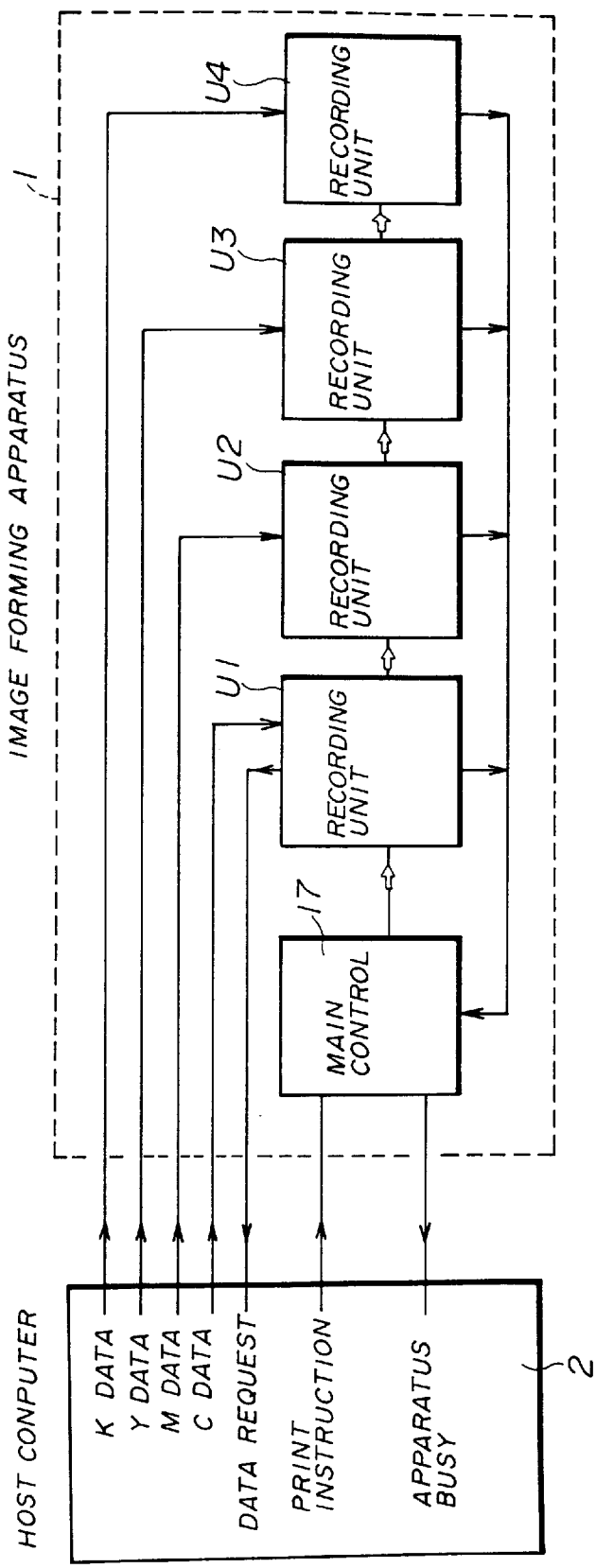
FIG. 3 is a system block diagram for explaining a controller of the first embodiment.

FIG. 3 is a diagram for explaining a controller of the image forming apparatus 1. In FIG. 3, the controller of the image forming apparatus 1 includes a main control unit 17 and the recording units U1 through U4. In response to the print instruction from the host computer 2, the main control unit 17 notifies state of the image forming apparatus 1 to the host computer 2 and controls each of the recording units U1 through U4, transfer timings of the recording sheets 10 and the like. The recording units U1 through U4 carry out operations which include receiving instructions from the main control unit 17, sending responses with respect to the received instructions, making data requests to the host computer 2, and receiving corresponding one of the Y, M, C, K image data.

3) Description of Recording Units

Figure 4:
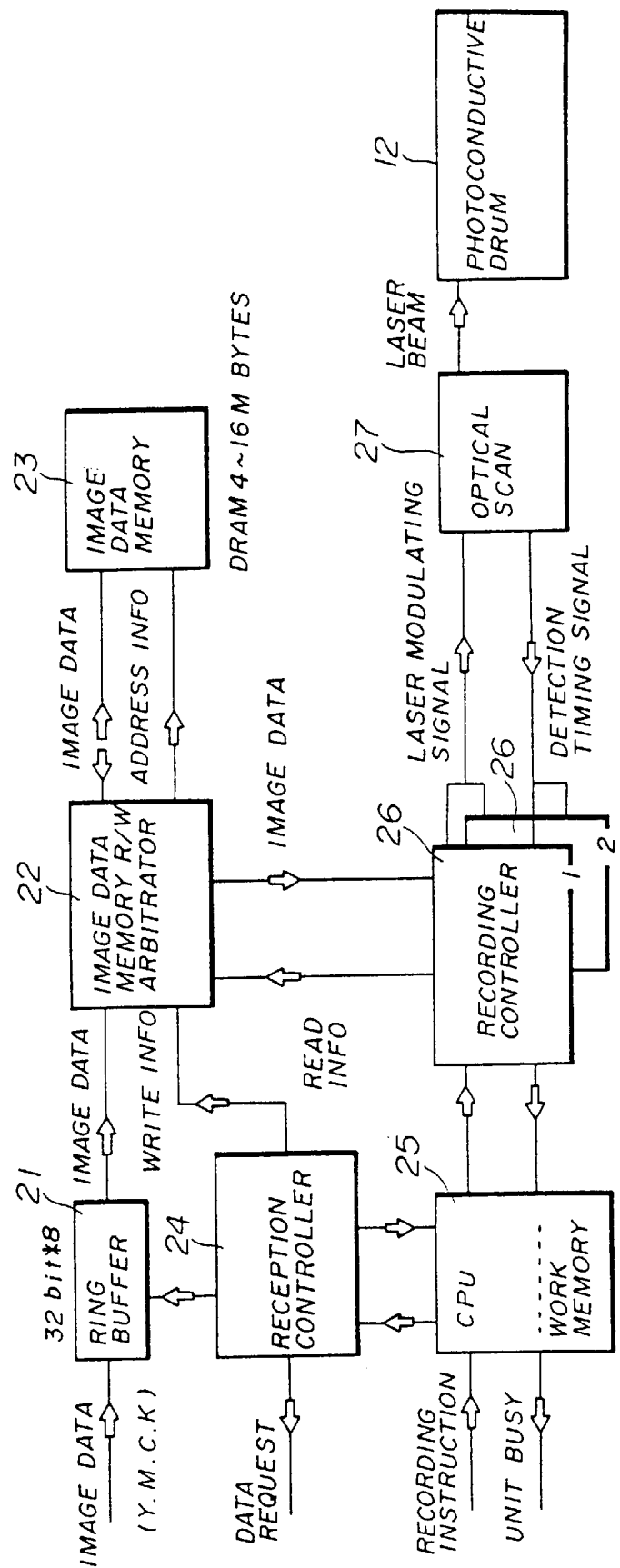
FIG. 4 is a system block diagram for explaining recording units of the first embodiment.

FIG. 4 is a diagram for explaining the recording units U1 through U4. The recording units U1 through U4 have the same construction, and the construction of one recording unit is shown in FIG. 4. In FIG. 4, the recording unit includes the photoconductive drum 12, a 32 bit×8 ring buffer 21, an image data memory read/write (R/W) arbitrator 22, an image data memory 23 made up of a 4 to 16 Mbyte dynamic random access memory (DRAM), a reception controller 24, a central processing unit (CPU) 25 including a work memory, two recording controllers 26, and an optical scan unit 27.

In the recording unit, the CPU 25 sends a unit busy to the main control unit 17 in response to a recording instruction from the main control unit 17 if recording preparations are not completed in the recording unit. On the other hand, if the recording preparations are completed in the recording unit when the CPU 25 receives the recording instruction from the main control unit 17, the reception controller 24 makes a data request of the recording unit to the host computer 2. The image data received from the host computer 2 are passed through the ring buffer 21 and the image data memory R/W arbitrator 22, and are temporarily stored in the image data memory 23 (data amounting to 1 page).

The recording controller 26 supplies read information such as read timings to the image data memory R/W arbitrator 22, and reads the image data from the image data memory 23 via the image data memory R/W arbitrator 22. In addition, the recording controller 26 supplies to the optical scan unit 27 a laser modulating signal which is modulated by the read image data. The optical scan unit 27 scans the photoconductive drum 12 by the laser beam which is modulated by the image data and forms a latent image on the photoconductive drum 12. Two recording controllers 26 are provided to increase the recording speed. In other words, two laser beams scan the photoconductive drum 12 under the control of the respective recording controllers 26 so as to form the latent image at a high speed.

The recording controller 26 also reads a detection timing signal from the optical scan unit 27, and supplies the laser modulating signal to the optical scan unit 27 based on the read detection timing signal.

4) General Description of Print Position Error Correction System

Figure 5:
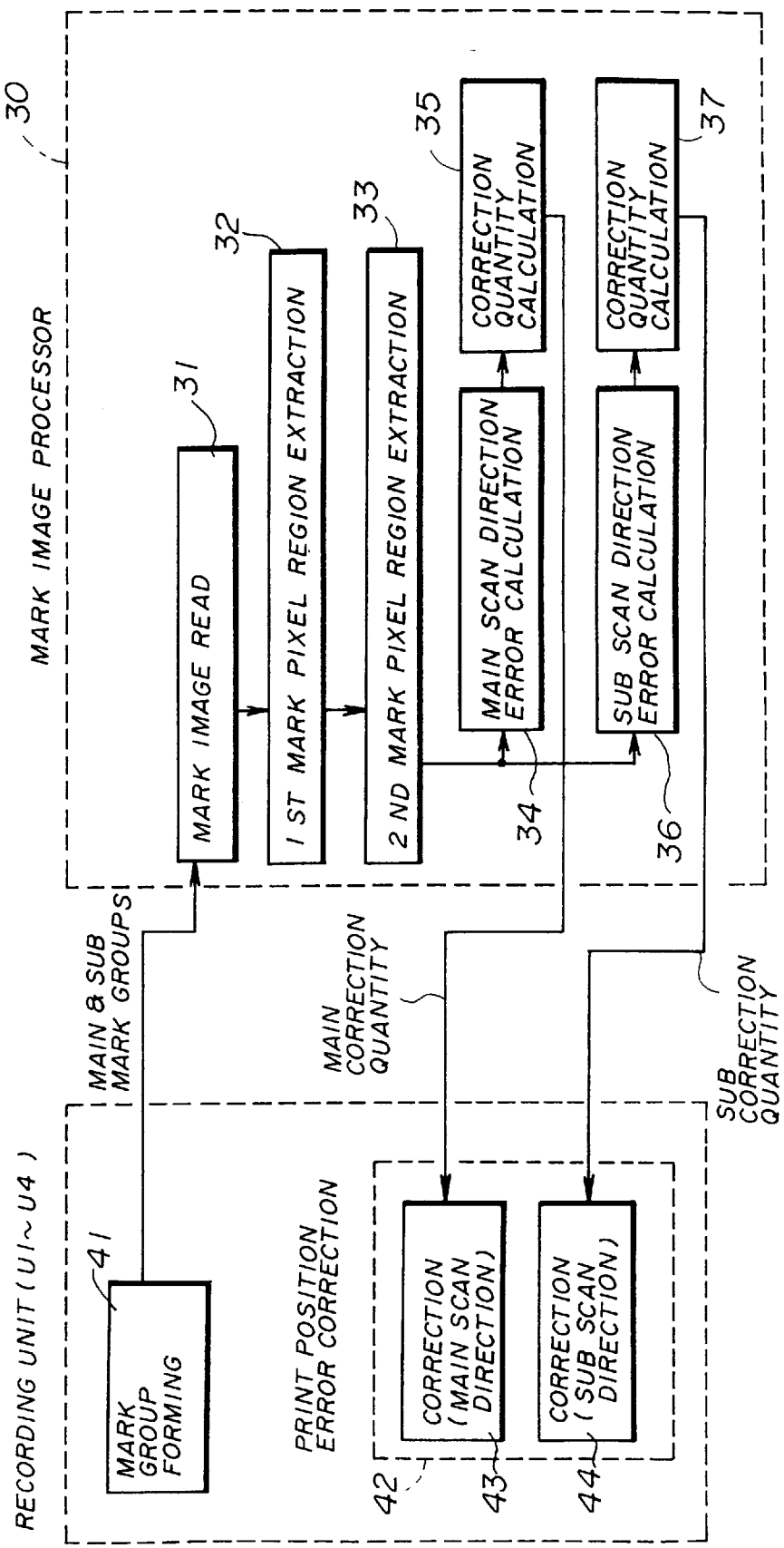
FIG. 5 is a system block diagram for explaining a print position error correcting system of the first embodiment.

FIG. 5 is a diagram for generally explaining a print position error correction system. In FIG. 5, The print position error correction system includes a mark image processor 30 and the recording units U1 through U4. The mark image processor 30 corresponds to the main control unit 17 shown in FIG. 3. The mark image processor 30 includes a mark image read unit 31, a first mark pixel region extraction unit 32, a second mark pixel region extraction unit 33, a main scan direction error calculation unit 34, a correction quantity calculating unit 35, a sub scan direction error calculation unit 36, and a correction quantity calculation unit 37. Each of the recording units U1 through U4 includes a mark image (CCD mark) forming unit 41, and a print position error correction unit 42. The print position error correction unit 42 includes a correction unit 43 for correcting a main scan direction start position and a printing width, and a correction unit 44 for correcting a sub scan direction start position and skew.

The operation of correcting the print position error is carried out as follows. The mark image read unit 31 reads a main pitch mark group and a sub pitch mark group which are formed on the belt-shaped transport means by the mark image forming unit 41, and generates transition point pixel data. Then, a main mark portion is extracted by the first mark image pixel region extraction unit 32, and a mark edge portion is extracted by the second mark image pixel region extraction unit 33. The main and sub pitch marks will be described later in conjunction with FIGS. 7C and 7D.

Thereafter, the main scan direction error calculation unit 34 calculates the amount of error in the main scan direction (main scan direction error) based on the extracted mark. The correction quantity calculation unit 35 calculates a correction quantity (main correction quantity) for the start position in the main scan direction and the printing width based on the main scan direction error calculated by the main scan direction error calculation unit 34. The correction unit 43 makes the corrections in the main scan direction so as to correct the main scan direction start position and the printing width.

On the other hand, the sub scan direction error calculation unit 36 calculates the amount of error in the sub scan direction (sub scan direction error) based on the extracted mark. The correction quantity calculation unit 37 calculates a correction quantity (sub correction quantity) for the start position in the sub scan direction and the skew based on the sub scan direction error calculated by the sub scan direction error calculation unit 36. The correction unit 44 makes the corrections in the sub scan direction so as to correct the sub scan direction start position and the skew.

The mark image processor 30 invalidates the image information of the extracted mark group and returns to the processing of a new mark group if the number of marks printed based on print information does not match the number of image pixel regions extracted by the first and second image pixel region extraction units 32 and 33. Accordingly, if a foreign substance such as dust particles amounting to the pixel width of the main mark portion adheres on the belt-shaped transport means, there is a possibility of this foreign substance being erroneously recognized as a mark, however, it is possible to eliminate the erroneously recognized mark based on the print information.

5) Description of Mark Image Read Unit

Figure 6:
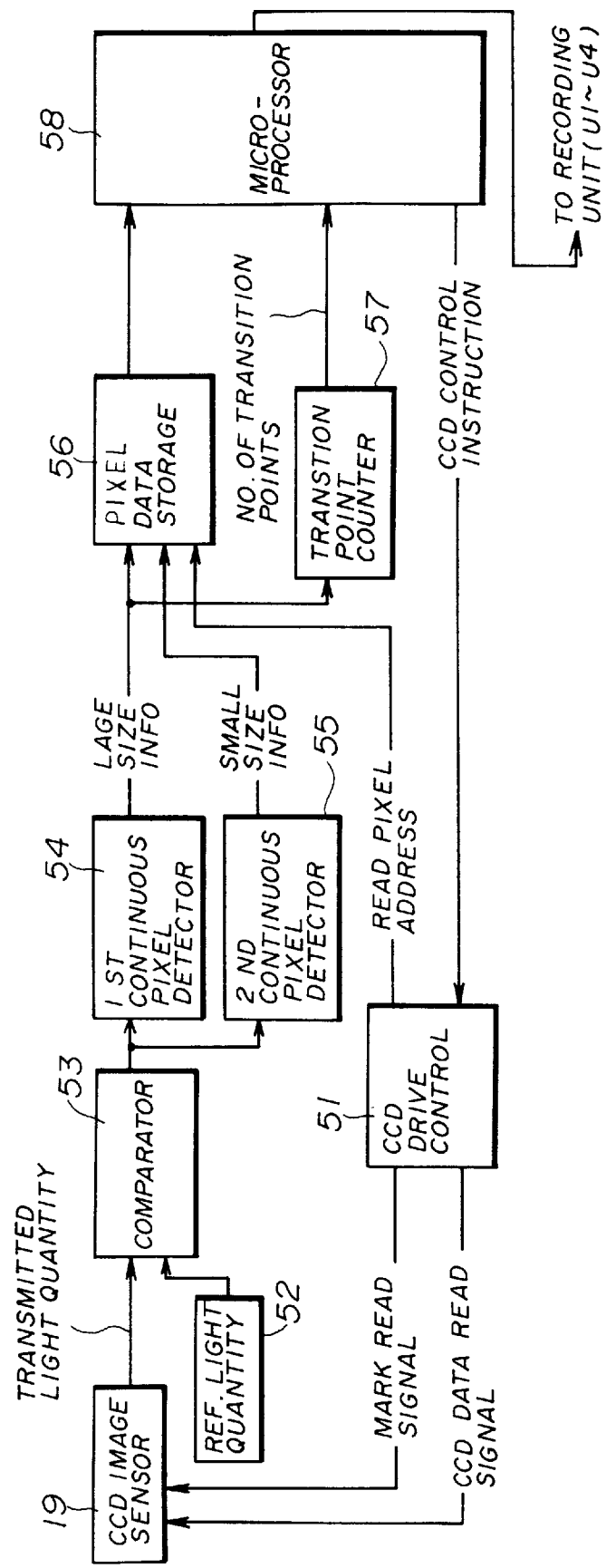
FIG. 6 is a system block diagram for explaining a mark image reading unit of the first embodiment.

FIG. 6 is a diagram for explaining the mark image read unit 31. In FIG. 6, the mark image read unit 31 includes a (charge coupled device) CCD image sensor 19 which is provided as an image pickup element, a CCD drive control circuit 51, a reference light quantity 52, a transmitted light quantity comparator 53, a first continuous pixel detector 54, a second continuous pixel detector 55, a pixel data storage 56, and a transition point counter 57. The mark image processor 30 shown in FIG. 5 may include a microprocessor 58 shown in FIG. 6. This microprocessor 58 successively reads the pixel data from the pixel data storage 56 of the mark image processor 30, and can carry out the processes of the first and second pixel region extraction units 32 and 33, the main scan direction error calculation unit 34, the correction quantity calculation unit 35, the sub scan direction error calculation unit 36 and the correction quantity calculation unit 37 within the mark image processor 30. In other words, the microprocessor 58 may be provided in place of the first and second pixel region extraction units 32 and 33, the main scan direction error calculation unit 34, the correction quantity calculation unit 35, the sub scan direction error calculation unit 36 and the correction quantity calculation unit 37 within the mark image processor 30.

The mark image read unit 31 operates as follows. That is, the CCD drive control circuit 51 supplies a mark read signal and a CCD data read signal to the CCD image sensor 19 in response to a CCD control instruction from the microprocessor 58. The CCD image sensor 19 outputs CCD data, that is, a transmitted light quantity, to the transmitted light quantity comparator 53. The transmitted light quantity comparator 53 compares the transmitted light quantity and the reference light quantity 52, and outputs a comparison result to the first and second continuous pixel detectors 54 and 55.

The first continuous pixel detector 54 detects continuous (or successive) pixels of a large size, and outputs large size information to the pixel data storage 56 and the transition point counter 57. In addition, the second continuous pixel detector 55 detects continuous (or successive) pixels of a small size, and outputs small size information to the pixel data storage 56.

The pixel data storage 56 stores (i) the transition point address (pixel address at each of a leading edge transition point and a trailing edge transition point) such as the large size information, the small size information and the read pixel address from the CCD drive control circuit 51, (ii) the type of transition point (leading edge and trailing edge), and (iii) the type of continuous pixel size.

The transition point counter 57 counts the transition points of the large size information, and notifies the number of transition points to the microprocessor 58. If the counted value in the transition point counter 57 falls outside a preset range, the microprocessor 58 invalidates the image information of the mark group and returns to the processing of a new mark group. For this reason, it is possible to improve the extraction accuracy of the mark pixel region by eliminating extracted mark pixel region as a burst mark defect (blur of the mark or dust particles) if the number of compressed data falls outside a prescribed value.

In addition, it is possible to provide a means for automatically adjusting the set value of the reference light quantity 52 in the mark image read unit 31, so that the counted value in the transition point counter 57 falls within the preset range. For example, by switching the set value of a slice level value shown in FIG. 14 which will be described later so that the set value decreases if the counted value exceeds the prescribed value and the set value increases if the counted value is smaller than the set value, it is possible to cope with changes in the mark tone and transmittance of the belt-shaped transport means (stains on the belt).

6) Description of Color Shear Detection

Figure 7A:
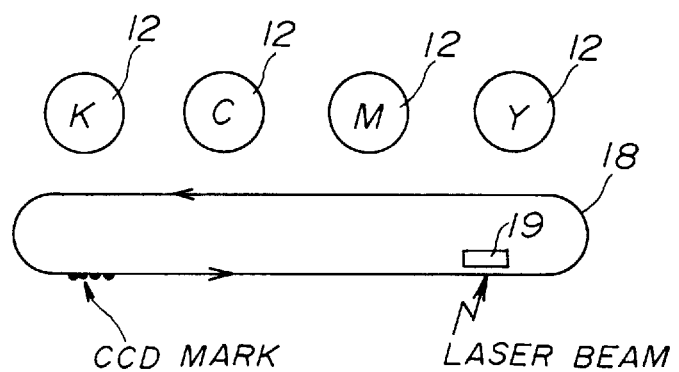
FIGS. 7A and 7B respectively are diagrams for explaining a CCD image sensor.
Figure 7B:
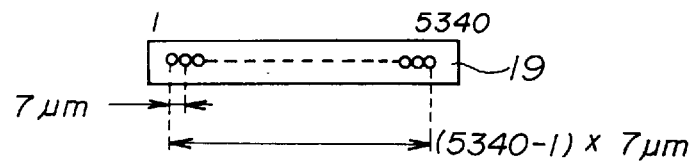

FIGS. 7A through 7D respectively are diagrams for explaining the color shear detection. FIGS. 7A and 7B respectively are diagrams for explaining the CCD image sensor, and FIGS. 7C and 7D are diagrams for explaining the arrangement of the CCD image sensors.

In FIG. 7A, the image forming apparatus 1 includes the photoconductive drums 12 which are respectively provided with respect to the colors Y, M C and K, a transparent transport belt 18 which forms the belt-shaped transport means for transporting the recording sheet 10, and the CCD image sensors 19 for detecting the CCD marks.

As shown on an enlarged scale in FIG. 7B, each CCD image sensor 19 has 5340 CCD cells arranged in a row, where each CCD cell corresponds to 1 pixel and has the size of 7×7 μm. The length of 1 row of the CCD cells between centers of the first and last CCD cells is (5340-1)×7 μm.

As shown in FIGS. 7C and 7D, 3 CCD image sensors 19 (CCD(1), CCD(2), CCD(3)) are arranged at an inclination of approximately 60° with respect to the laser beam scan direction. 1 CCD mark (bar) is printed on the transparent transport belt 18 between 2 successive recording sheets 10 by a corresponding one of the photoconductive drums 12, with respect to each of the colors K, C, M and Y.

FIG. 7C shows sub pitch marks, that is, CCD marks K, C, M and Y, which extend in a direction parallel to the laser beam scan direction. The sub pitch marks are printed at 3 different locations on the transparent transport belt 18 so that each sub pitch mark group can be detected by a corresponding one of the 3 CCD image sensors 19.

FIG. 7D shows main pitch marks, that is, CCD marks Y, M, C and K, which extend in a direction perpendicular to the laser beam scan direction. The main pitch marks are printed at 3 different locations on the transparent transport belt 18 so that each main pitch mark group can be detected by a corresponding one of the 3 CCD image sensors 19.

The 3 CCD image sensors 19 are arranged at the above described inclination with respect to the laser beam scan direction, so that both the sub pitch mark group and the main pitch mark group can be detected by 1 CCD image sensor 19. The CCD marks are removed from the transparent transport belt 18 by a blade (not shown) after being read by the CCD image sensors 19.

A description will be given of a color shear detection means by referring to FIGS. 7A through 7D.

(1) In FIG. 7A, 3 CCD image sensors 19 are arranged above the transparent transport belt 18 at the inclination of approximately 60° with respect to the laser beam scan directions at a position on a downstream side of the fourth K photoconductive drum 12 along the transport direction of the recording sheet 10. Each photoconductive drum 12 prints a corresponding one of the CCD marks Y, M, C and K on the transparent transport belt 18 at a position between 2 successive recording sheets 10 and located 10 to 40 mm from the lower edge of the first one of the 2 successive recording sheets 10, every time a printing is made.

(2) At the time when the 4 printed CCD marks Y M, C and K enter pixel regions of the CCD image sensor 19, a laser pulse beam is irradiated from below the transparent transport belt 18 from a light source (not shown), and the CCD image sensor 19 reads a change in the transmitted light quantity depending on the existence of the CCD marks Y, M, C and K.

(3) As described above, the CCD image sensor 19 includes 5340 CCD cells arranged in a row, and the transmitted light quantity corresponding to the pixel position is converted into a charge quantity and stored for each of the 5340 CCD cells. In other words, a small charge is stored at a pixel which is blocked by the CCD mark Y, M, C or K, and a large charge is stored at an unblocked pixel.

(4) Next, the charge quantities stored for each of the CCD cells are successively read from the first pixel and compared with a set value. As a result of this comparison, a point in time when the read charge quantity is less than the set value is judged as being a block start point by the CCD marks Y, M, C and K, and a point in time when the read charge quantity returns to a value greater than or equal to the set value is judged as being a block end point. Pixel numbers corresponding to the above points in time are stored in the pixel data storage 56.

(5) When the 4 CCD marks Y, M, C and K are printed on the transparent transport belt 18, the number of pixel numbers stored in the pixel data storage 56 becomes 8 (=(pixel numbers corresponding to the blocking start and end points)×4). However, approximately 50 pixel numbers are actually stored in the pixel data storage 56 due to uneven edges of the CCD marks Y, M, C and K, stains on the surface of the transparent transport belt 18 and the like. For this reason, a process which will be described later is carried out in accordance with a predetermined algorithm so as to extract 8 transition points of the CCD mark portion which is made up of the CCD marks Y, M, C and K.

(6) A difference in the pixel numbers is converted into distance by multiplying a predetermined coefficient, for example, and a color shear quantity is measured by calculating a shear (error) quantity with respect to the CCD mark K by using the CCD mark K as a reference. It is preferable to calculate the shear (error) quantity by using the CCD mark K as the reference since black is frequently used for the printing, however, it is of course possible to use one of the other CCD marks Y, M and C as the reference.

The detection of the CCD marks may also be made using reflected light in place of the transmitted light. In this case, a transport belt having a light reflecting characteristic is used in place of the transparent transport belt 18.

7) Description of Color Shear Quantity Measurement

[Description of Sub Scan Direction Error Calculation Unit]

(a) Description of Start Position Error in Sub Scan

Figure 8:
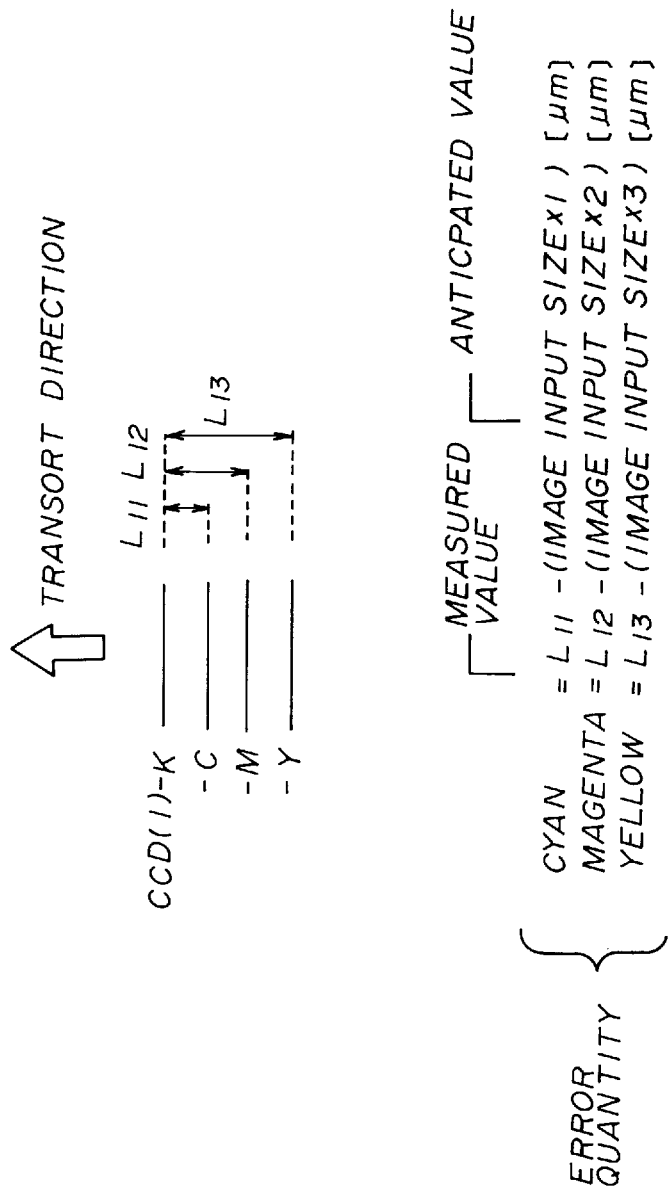
FIG. 8 is a diagram for explaining an error of a sub scan start position in the first embodiment.

FIG. 8 is a diagram for explaining an error in the sub scan start position. In FIG. 8, 1 of the 3 CCD image sensors 19, that is, the CCD(1), is used to detect the 4 CCD(1) marks K, C, M and Y which are printed on the transparent transport belt 18 in a direction perpendicular to the transport direction of the recording sheet 10. Then, intervals $L_{11}$, $L_{12}$ and $L_{13}$ between the CCD(1) mark K and each of the CCD(1) marks C, M and Y are measured. Measured values of the intervals $L_{11}$, $L_{12}$ and $L_{13}$ are compared with anticipated values of the raster unit so as to detect the error quantity.

If it is assumed that the 4 CCD(1) marks K, C, M and Y are printed at constant intervals, the error quantity of the sub scan start position can be calculated as follows.

Error Quantity of Cyan
= $L_{11}$ - (Image Input Size) × 1 [$\mu$m]
Error Quantity of Magenta
= $L_{12}$ - (Image Input Size) × 2 [$\mu$m]
Error Quantity of Yellow
= $L_{13}$ - (Image Input Size) × 3 [$\mu$m]

(b) Description of Skew

Figure 9:
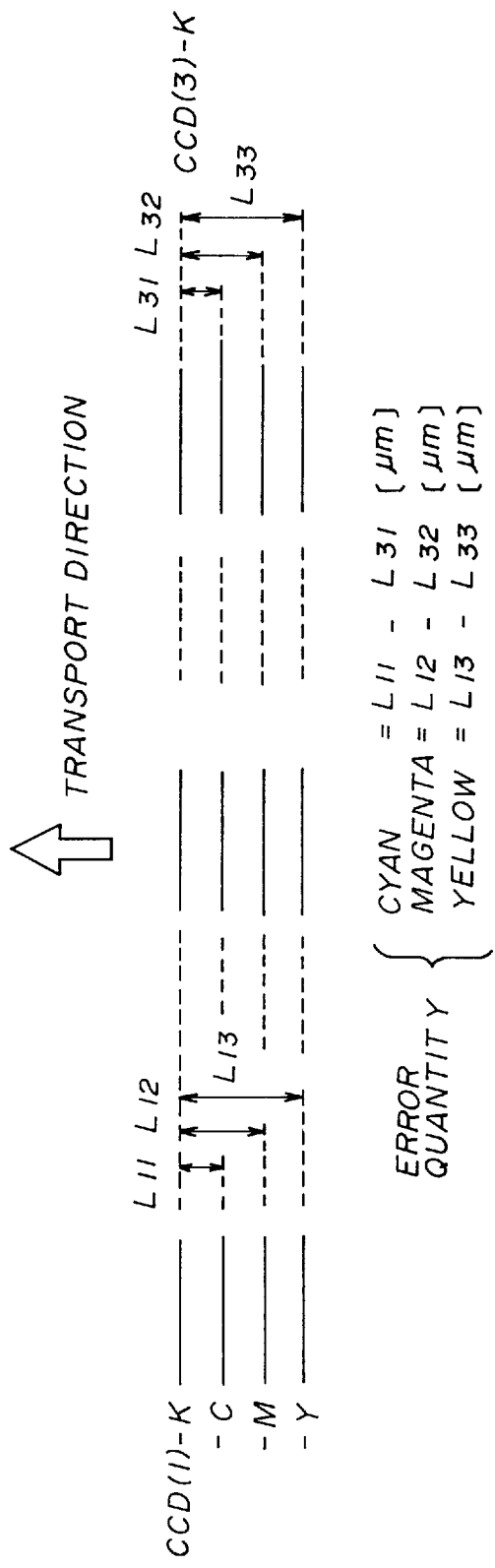
FIG. 9 is a diagram for explaining a skew in the first embodiment.

FIG. 9 is a diagram for explaining the skew. In FIG. 9, the skew in the sub scan direction (parallel shear) is detected by use of 2 of the 3 CCD image sensors 19, that is, the CCD(1) and CCD(3). The CCD(1) and CCD(3) respectively detect the 4 CCD(1) marks K, C, M and Y and the 4 CCD(3) marks K, C, M and Y which are printed on the transparent transport belt 18 in a direction perpendicular to the transport direction of the recording sheet 10. Then, intervals $L_{11}$, $L_{12}$ and $L_{13}$ between the CCD(1) mark K and each of the CCD(1) marks C, M and Y, and intervals $L_{31}$, $L_{32}$ and $L_{33}$ between the CCD(3) mark K and each of the CCD(3) marks C, M and Y are measured. Measured values of the intervals $L_{11}$, $L_{12}$ and $L_{13}$ are compared with measured values of the intervals $L_{31}$, $L_{32}$ and $L_{33}$ so as to detect the error quantity.

The error quantity of the skew in the sub scan direction can be calculated as follows.

Error Quantity of Cyan = $L_{11} - L_{31}$ [$\mu$m]
Error Quantity of Magenta = $L_{12} - L_{32}$ [$\mu$m]
Error Quantity of Yellow = $L_{13} - L_{33}$ [$\mu$m]

[Description of Main Scan Direction Error Calculation Unit]

(a) Description of Start Position Error in Main Scan

FIG. 10 is a diagram for explaining an error in the main scan start position. In FIG. 10, 1 of the 3 CCD image sensors 19, that is, the CCD(1), is used to detect the 4 CCD(1) marks K, C, M and Y which are printed on the transparent transport belt 18 in a direction parallel to the transport direction of the recording sheet 10. Then, intervals $L_{11}$, $L_{12}$ and $L_{13}$ between the CCD(1) mark K and each of the CCD(1) marks C, M and Y are measured. Measured values of the intervals $L_{11}$, $L_{12}$ and $L_{13}$ are compared with anticipated values of the raster unit so as to detect the error quantity of course, it is possible to use the CCD(2) or CCD(3) in place of the CCD(1).

If it is assumed that the 4 CCD(1) marks K, C, M and Y are printed at constant intervals, the error quantity of the main scan start position can be calculated as follows.

Error Quantity of Cyan
= $L_{11}$ - (Image Input Size) × 1 [$\mu$m]
Error Quantity of Magenta
= $L_{12}$ - (Image Input Size) × 2 [$\mu$m]
Error Quantity of Yellow
= $L_{13}$ - (Image Input Size) × 3 [$\mu$m]

(b) Description of Printing Width Error of Main Scan

The mark image forming unit 41 divides the print region in the main scan direction into one or more sections, and prints a mark group at the start and terminal ends of each section, where colors for detecting the position error are arranged within the mark group. The print position error correction unit 42 corrects the printing width error. The mark image processor 30 forms the correction quantity of the print position error correction unit 42 with respect to the printing width solely from a value made up of units of sections which are obtained by further dividing the printing density. If the number of each of of the sections is 2 or greater, the correction quantity of a first section is calculated depending on the error quantity of the first section. The correction quantity of a second or subsequent section is corrected by subtracting the correction quantity of the previous section from the correction quantity which is calculated from the error quantity of the present section. Hence, the correction of the printing width for all of the sections can be made at the same time, thereby making it possible to reduce the processing time.

FIG. 11 is a diagram for explaining the error in the main scan printing width. In FIG. 11, the error in the main scan printing width is detected by use of the 3 CCD image sensors 19, that is, the CCD(1), CCD(2) and CCD(3). The CCD(1), CCD(2) and CCD(3) respectively detect the 4 CCD(1) marks K, C, M and Y, the 4 CCD(2) marks K, K, M and Y, and the 4 CCD(3) marks K, C, M and Y which are printed on the transparent transport belt 18 in the direction parallel to the transport direction of the recording sheet 10. Next, intervals $L_{11}$, $L_{12}$ and $L_{13}$ between the CCD(1) mark K and each of the CCD(1) marks C, M and Y, intervals $L_{21}$, $L_{22}$ and $L_{23}$ between the CCD(2) mark K and each of the CCD(2) marks C, M and Y, and intervals $L_{31}$, $L_{32}$ and $L_{33}$ between the CCD(3) mark K and each of the CCD(3) marks C, M and Y are measured. Measured values of the intervals $L_{11}$, $L_{12}$ and $L_{13}$, the intervals $L_{12}$ $L_{22}$ and $L_{23}$, and the intervals $L_{31}$, $L_{32}$ and $L_{33}$ are compared so as to detect the error quantity.

The error quantity of the printing width in the main scan direction is calculated as follows for the first and second sections.

Error Quantity of First Section

Error Quantity of Cyan = $L_{21} - L_{11}$ [μm]
    Error Quantity of Magenta = $L_{22} - L_{12}$ [μm]
    Error Quantity of Yellow = $L_{23} - L_{13}$ [μm]

Error Quantity of Second Section

Error Quantity of Cyan = $L_{31} - L_{11}$ [μm]
    Error Quantity of Magenta = $L_{32} - L_{12}$ [μm]
    Error Quantity of Yellow = $L_{33} - L_{13}$ [μm]

Therefore, the 2 kinds of marks (sub pitch marks and main pitch marks) for detecting the print position errors in the main scan direction and the sub scan direction are alternately printed on the transparent transport belt 18, and the correction quantities for the main and sub scan directions are successively obtained based on the 2 kinds of marks. As a result, the print position error correction unit 42 can simultaneously correct the print position errors in both the main and sub scan directions based on the correction quantities.

In addition, it is possible to provide a correction mode switching means for selectively switching between 2 correction modes in the mark image forming unit 41. In this case, the 2 correction modes includes a correction mode in which 2 or more kinds mark groups for detecting the print position errors in the main and sub scan directions are alternately printed on the transparent transport belt 18, and a correction mode in which a continuous printing is made on the transparent transport belt 18 for every mark.

Accordingly, the 2 kinds marks for detecting the print errors in the main and sub scan directions are first alternately printed on the transparent transport belt 18, and a decision is then made to determine whether the error quantities in the main and sub scan directions fall within prescribed values. If the error quantities in the main and sub scan directions both fall outside the prescribed values, error quantities are obtained by again alternately printing 2 kinds of marks for detecting the print errors in the main and sub scan directions after carrying out the correction by the print position error correction unit 42. On the other hand, if only one of the error quantities in the main and sub scan directions falls outside the prescribed value, the marks of only the corresponding kind are continuously printed and the error quantity for the corresponding scan direction is obtained, so that the processing time of the position error correction can be minimized.

Furthermore, it is possible to easily calculate the error quantities and use a common calculation procedure by arranging the colors of the marks which are stored in the CCD image sensor 19 in the order of the pixel address identical for the main scan direction and the sub scan direction.

8) Description of Plot Output (Print Position Error Correction) Which Finely Adjusts Plot Position
[Description of Sub Scan Direction Start Position and Skew Correction Means]

Figure 12A:
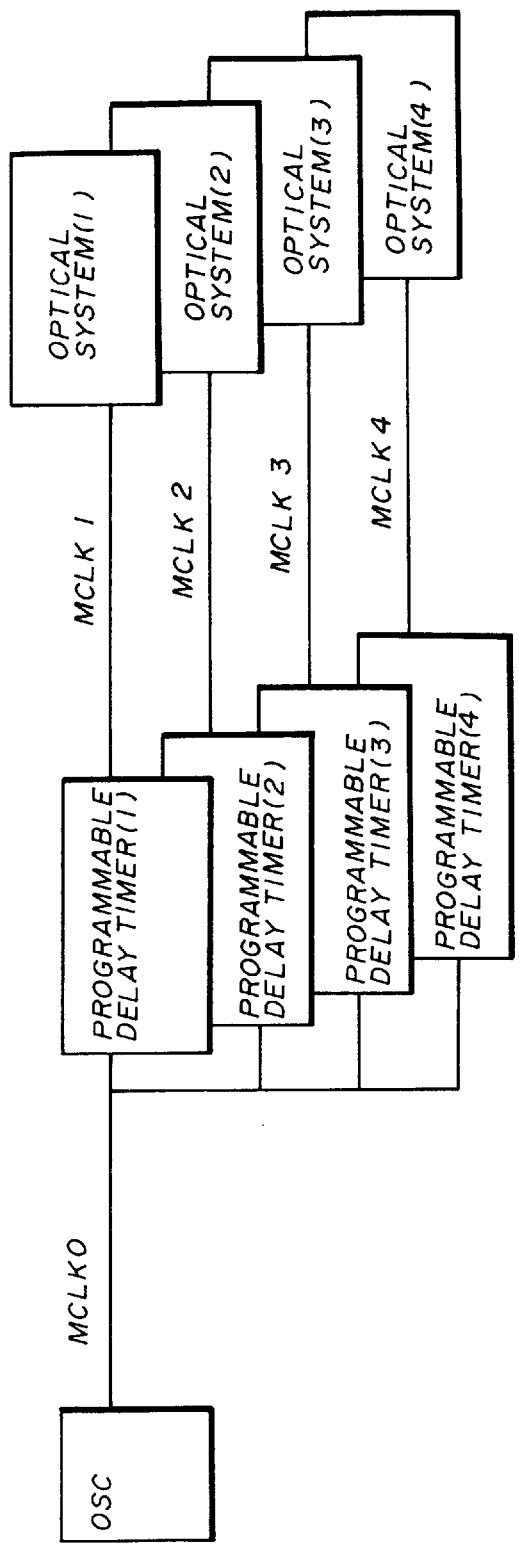

(a) FIGS. 12A and 12B are diagrams for explaining the start position correction in the sub scan direction. FIG. 12A shows an oscillator (OSC) which generates a synchronizing signal MCLK0 having a desired beam scan period, programmable delay timers (1) through (4) provided for each of optical systems, and the optical systems (optical units Y, M, C and K) (1) through (4) each having a mirror motor controller.

FIG. 12B shows signal waveforms of the synchronizing signal MCLK0 output from the oscillator (OSC), synchronizing signals MCLKn (n=1, . . . , 4) which are obtained by delaying the synchronizing signal MCLK0 i the programmable delay timers (1) through (4), and beam scan detection signals BDSn (n=1, . . ., 4) which correspond to the detection timings (outputs of laser beam detector) of the beam scans synchronized to the synchronizing signals MCLKn.

The programmable delay timers (1), (2), (3) and (4) delay the synchronizing signal MCLK0 from the oscillator (OSC) depending on the error quantities in the sub scan direction, and supply delayed synchronizing signals MCLK1, MCLK2, MCLK3 and MCLK4 to the corresponding optical systems (1), (2), (3) and (4). The optical systems (1), (2), (3) and (4) supply the external input signals (synchronizing signals MCLK1, MCLK2, MCLK3 and MCLK4) to the mirror motor controller which employs a PLL control, and carry out the beam scans in synchronism with the external input signals.

By varying the delay timer values of the programmable delay timers (1) through (4) depending on the error quantity in the sub scan direction described above in conjunction with FIG. 8, it is possible to adjust the sub scan timings of the optical systems (1) through (4) and correct the color shear in the sub scan direction. The unit of this correction is 1 raster unit in the case of a rough adjustment, and $\frac{1}{22}$ to $\frac{1}{55}$ raster unit in the case of a fine adjustment.

(b) Description of Skew Correction

The skew correction is carried out by rotating each of the Y, M, C and K optical units 13 by a small angle about a vertical axis depending on the error quantity described above in conjunction with FIG. 9. For example, this rotation by a small angle is achieved by pushing a reference surface of the optical unit 13 against a lever (not shown) of the image forming apparatus 1, and rotating the lever by a stepping motor or the like depending on the error quantity of the skew. Such a correction can be carried out in units of 25 μm/step, for example.

[Description of Main Scan Direction Start Position and Printing Width Correction Means]

Figure 13A:
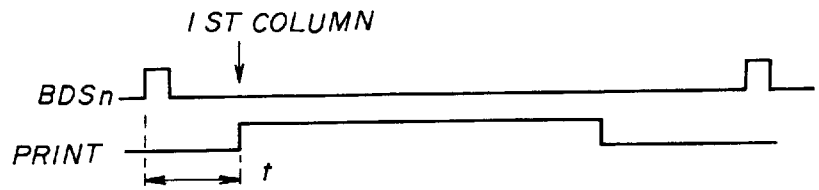
FIG. 13A is a diagram for explaining the correction of a start position in a main scan direction correction control system of the first embodiment.
Figure 13B:
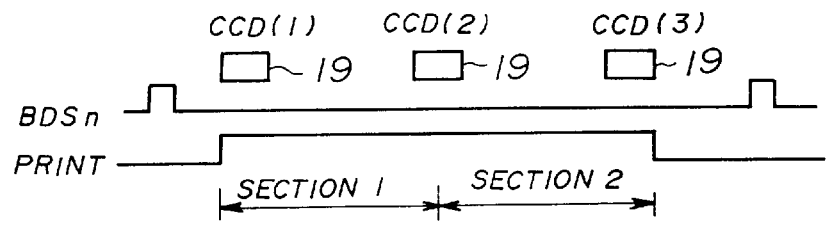
FIG. 13B is a diagram for explaining the correction of a printing width in the main scan direction correction control system of the first embodiment.
Figure 13C:
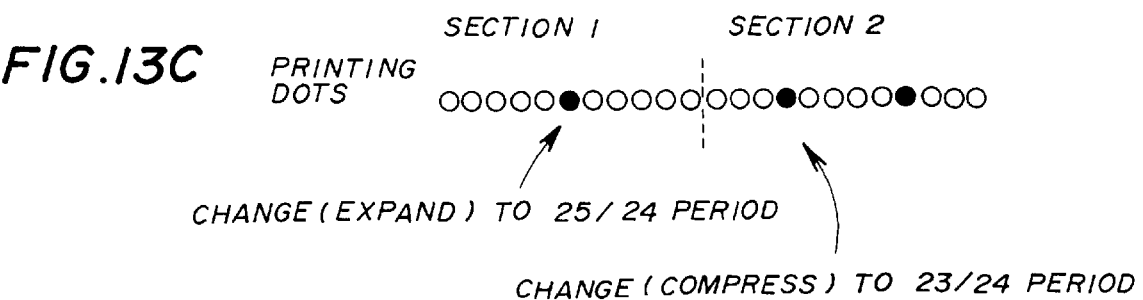
FIG. 13C is a diagram for explaining an example of the correction of the printing width in the main scan direction correction control system of the first embodiment.

FIGS. 13A through 13B respectively are diagrams for explaining the correction control system for the main scan direction. FIG. 13A is a diagram for explaining the correction of the start position, FIG. 13B is a diagram for explaining the correction of the printing width, and FIG. 13C is a diagram for explaining an example of the correction of the printing width.

(a) Description of Correction of Main Scan Start Position

The correction of the main scan start position is carried out by adjusting the time from the detection of the beam scan detection signal BDS to the printing of a first column (printing dots) depending on the error quantity described above in conjunction with FIG. 10. In FIG. 13A, the correction is made by adjusting a time t from the output of the beam scan detection signal BDSn to the printing of the first column. This correction can be made in units of 1 column in the case of a rough adjustment, and in units of $\frac{1}{16}$ to $\frac{1}{24}$ column in the case of a fine adjustment.

(b) Description of Correction of Printing Width

The correction of the printing width is carried out by providing a video clock modulation means for compressing or expanding the dot period by ±1/N at an arbitrary column position, calculating the compression or expansion number depending on the error quantity described above in conjunction with FIG. 11, and compressing or expanding the printing width by uniformly distributing the compressed or expanded portion. In FIG. 13B, the adjustment is made by dividing a print portion which is a predetermined after the output of the beam scan detection signal BDSn into a first section 1 and a second section 2. For example, the correction can be made in units of $1/16$ to $1/24$ column in the case of a fine adjustment.

In FIG. 13C, as an example of the correction of the printing width, it is assumed for the sake of convenience that the resolution is 240 dpi, the dots are printed at a normal period of $24/24$, and error quantities of a certain color with respect to black (K) between the first and second sections 1 and 2 require corrections of $+1/24$ and $-2/24$ column. In this case, the first section 1 is changed (expanded) to a period of $25/24$, and the second section 2 is changed (compressed) to a period of $23/24$. In FIG. 13C, the dots having the normal period of $24/24$ are indicated by white circular marks, while the dots having the changed period are indicated by black circular marks.

Hence actually, the correction quantity of the second section 2 is processed as $(-2/24)+(+1/24)=-1/24$ by taking into consideration the correction quantity of the first section 1. In this particular example, the compression is carried out once at an intermediate portion of the second section 2.

9) Description of CCD Mark Extraction Process (Algorithm)

Approximately 50 transition point pixel address data are obtained by detecting the 4 CCD marks by the corresponding CCD image sensor 19, and 8 points of the CCD mark portion are extracted from the approximately 50 transition point pixel address data according to the following procedure.

First, when a light blocking member of 800 $\mu$m is placed, an output having a small charge quantity of 800 $\mu$m÷7 $\mu$m≈114 continuous (or successive) pixels is obtained from the CCD image sensor 19. Hence, a similar result is anticipated with respect to the CCD mark having a width of 800 $\mu$m. However, at the stage of evaluating the static CCD mark which is read, the following problems may occur.

First, the edge of the CCD mark may become unclear due to the enlargement of the edge portion, that is, a chattering may occur in a vicinity of the edge.

Second, when the edge portion of the CCD mark is enlarged, large irregularities are introduced due to the shape of the dots. In other words, a measurement error is introduced between the error quantities among the marks.

Third, the dot shear becomes large among the faces of the polygonal mirror due to the enlargement of the edge portion of the CCD mark. That is, a measurement error is introduced between the error quantities among the marks.

Fourth, the enlargement of the edge portion of the CCD mark may cause dropout, that is, unprinted dots, due to insufficient mark width.

In this embodiment, the following measures are taken against the first through fourth problems described above. More particularly, the extracting algorithm and averaging are appropriately selected so as to avoid the first problem. The effect of averaging is observed with respect to the second problem. With respect to the third problem, a correction is made with respect to the faces of the polygonal mirror before carrying out the correction control of this embodiment. In addition, the extracting algorithm is appropriately selected so as to avoid the fourth problem.

(a) Description of CCD Mark Extraction Algorithm (1) 2 filters for respectively checking a large size of 110 $\mu$m and a small size of 25 $\mu$m are provided to check the continuity of the nontransmitted pixels (CCD marks).

(2) The 2 filters are used when successively reading from the first pixel of the CCD image sensor 19, so as to obtain the pixel numbers at both ends of each of the non-transmitting pixel groups which are 110 $\mu$m or greater or, between 25 and 110 $\mu$m, and do not pass through the 2 filters. The obtained pixel numbers are stored in the pixel data storage 56 together with a discriminating code of the start/terminal ends and the type of filter.

(3) The pixel number at the start and terminal ends of the CCD mark K can be extracted as follows by the operation of the microprocessor 58 of the mark image processor 30.

First, a reference is made to the start end pixel number of a large pixel group that is used to detect the main portion of the CCD mark K in the pixel data storage 56. The large pixel group is detected when 16 or pixels of the CCD image sensor 19 detect the CCD mark K. The first start end pixel is regarded as the start end pixel number of the CCD mark K, and a pixel adjacent to the right of this first start end pixel, having an address which is 1 greater than the present address, is regarded as the terminal end pixel number.

Then, a reference is made to the start end pixel number of a small pixel group that is used to detect the edge portion of the CCD mark K. The small pixel group is detected when 4 to 16 pixels of the CCD image sensor 19 detect the CCD mark K. If such a start end pixel number of the small pixel group exists at a pixel adjacent to the left of the first start end pixel, having an address which is 1 less than the present address, the start end pixel number of the CCD mark K is unconditionally updated to this start end pixel number, thereby connecting the pixel groups.

If a reference is made to the right side of the start end pixel number up to 110% of the width of the CCD mark K and a terminal end pixel number of a new large pixel group exists, this terminal end pixel number successively updates the terminal end pixel number as the new terminal end pixel number, thereby connecting the pixel groups.

Next, a reference is made to the left side of the start end pixel number up to 110% of the width of the CCD mark K. If a start end pixel number of a small pixel group exists, this start end pixel number successively updates the start end pixel number as the new start end pixel number, thereby connecting the pixel groups.

Furthermore, a reference is made to the right side of the terminal end pixel number up to 110% of the width of the CCD mark K. If a start end pixel number of a small pixel group exists, the terminal pixel number adjacent to the left of this start end pixel number successively updates the terminal end pixel number as the new terminal end pixel number.

(3) The start and terminal end pixel numbers of the next CCD marks C, M and Y are extracted as follows.

Using a pixel adjacent to the right of the terminal end pixel of the CCD mark K as a start, the start and terminal end pixel numbers of the CCD mark C are extracted by making a reference similarly to that with respect to the CCD mark K described above under item (3). Similarly, the start and terminal end pixel numbers of the CCD marks M and Y are also extracted.

(b) Description of Mark Extraction Process Using Drawings

Figure 14:
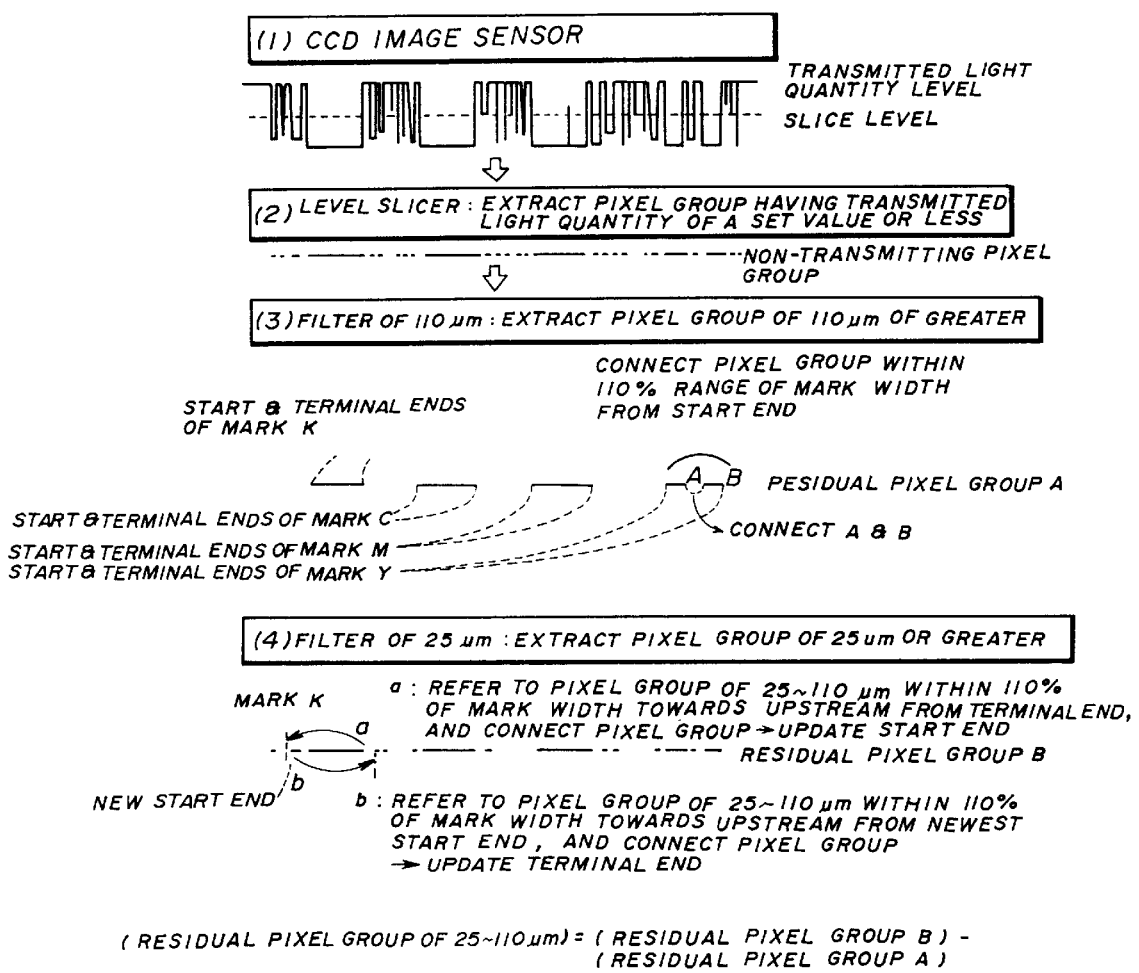
FIG. 14 is a diagram for explaining a mark extraction process of the first embodiment.

FIG. 14 is a diagram for explaining the mark extraction process. In FIG. 14, the waveforms from the top to bottom of the figure indicate an output waveform of the CCD image sensor 19, a non-transmitting pixel group, a residual pixel group A and a residual pixel group B. A description will be given of the CCD mark extraction process by referring to these waveforms.

(1) A slice level indicated by a dotted line in FIG. 14 is set between an upper end and a lower end of the output waveform of the CCD image sensor 19. The upper end of the output waveform of the CCD image sensor 19 corresponds to the level of the transmitted light quantity.

(2) The output waveform of the CCD image sensor 19 is sliced at the slide level indicated by the dotted line, so as to extract a pixel group having a transmitted light quantity less than or equal to a set value, that is, a non-transmitting pixel group.

(3) The filter for checking the large size of 110 μm is used to extract a large pixel group having the size of 110 μm or greater, that is, the residual pixel group A, and to store the residual pixel group A in the pixel data storage 56 in order to connect the pixel groups. First, a reference is made to the start end pixel number of the large pixel group in the pixel data storage 56, and the first start end pixel is regarded as having the start end pixel number of the CCD mark K, while the pixel adjacent to the right thereof is regarded as having the terminal end pixel number. Next, a reference is made to the right side of the start end pixel up to 110% of the width of the CCD mark, and if a terminal end pixel number of a large pixel group newly exists, this terminal end pixel number successively updates the terminal end pixel number as the new terminal end pixel number. In the case of the CCD mark Y shown in FIG. 14, the mark A and the mark B are connected. The above described process corresponds to the operation of the first mark pixel region extraction unit 32 shown in FIG. 5.

(4) The filter for checking the small size of 25 μm is used to extract a small or large pixel group having the size of 25 μm or greater, that is, the residual pixel group B, and to store the residual pixel group B in the pixel data storage 56 in order to connect the pixel groups.

First, in a step a, a reference is made from the terminal end towards the upstream side for a range of up to 110% of the width of the CCD mark, a pixel group connection process is carried out if a small pixel group of 25 to 110 μm exists, and the start end is updated. Furthermore, in a step b, a reference is made from the newest start end towards the terminal end for a range of up to 110% of the width of the CCD mark to find a small pixel group of 25 to 110 μm, a pixel group connection process is carried out, and the terminal end is updated. The above described process corresponds to the operation of the second mark pixel region extraction unit 33 shown in FIG. 5.

The small pixel group, that is, the residual pixel group of 25 to 110 μm, is obtained from the following formula.

(Residual Pixel Group of 25 to 110 μm)=(Residual Pixel Group B)−(Residual Pixel Group A)

Hence, the large size set with respect to the filter is selected to a value which is approximately ⅓ to ⅙ of the prescribed mark width. In addition, the small size set with respect to the filter is selected to a value which is approximately 10 to 30 μm. In other words, the large and small sizes set with respect to the filters are selected to values which are sufficiently small compared to the mark width. For this reason, even if the CCD mark is thin or partially missing, it is possible to detect the mark region with a high accuracy.

(c) Description of Averaging

The mark image processor 30 counts the number of extractions of the extracted mark groups. When the counted number of extractions reaches a preset number of mark group extractions, an average of relative quantities of the number of mark group extractions is obtained for each color, by excluding 2 maximum values (Max) and 2 minimum values (Min) from the averaging. Then, an error quantity of each color with respect to a reference mark color is calculated from the average value and a reference value, and a correction quantity is calculated from the error quantity for each color.

Figure 15:
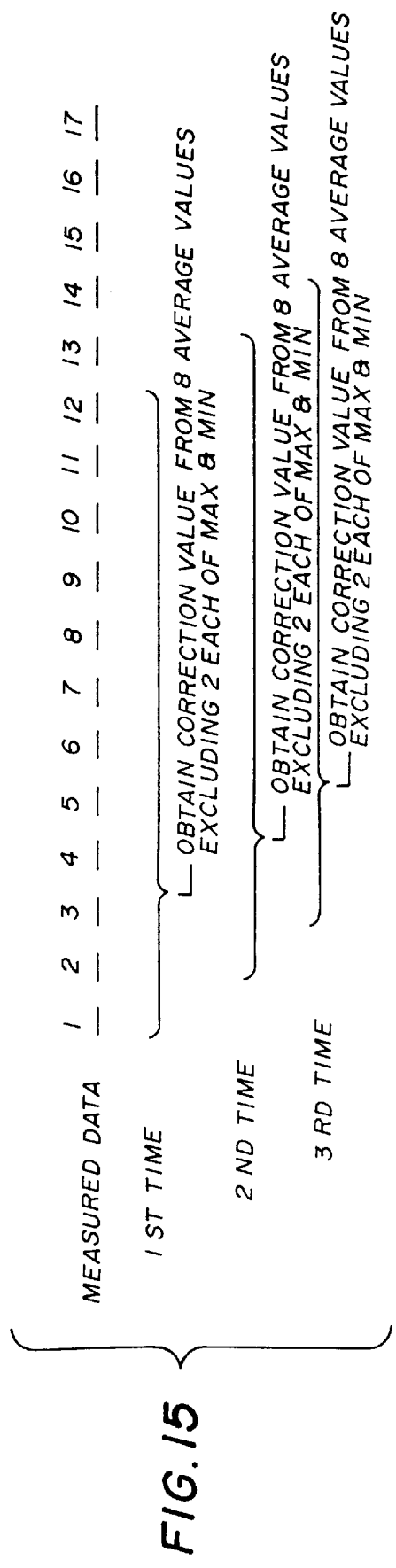
FIG. 15 is a diagram for explaining the averaging of measured data in the first embodiment.

FIG. 15 is a diagram for explaining the averaging of measured data. FIG. 15 shows 17 data obtained by detecting the CCD mark and carrying out the extraction process, that is, measured data 1 through 17. First, at the first time, 12 measured data 1 through 12 are used, and the correction value is obtained from the average value of 8 measured data excluding the 2 maximum values (Max) and 2 minimum values (Min).

Next, at the second time, the correction value is obtained from the average value of 8 measured data excluding 2 maximum values (Max) and 2 minimum value (Min) from the 12 measured data 2 through 13. Further, at the third time, the 23 measured data 3 through 14 are used. The correction value is obtained similarly thereafter from the average value of measured data by successively including a new measured data in the group to be averaged.

The first embodiment described above may be modified as follows.

In this modification of the first embodiment, the mark image processor 30 includes a means for successively storing in a work register the pixel region data which are extracted by extracting mark pixel regions of each of the colors by the first and second mark pixel region extraction units 32 and 33, a means for counting the number of extracted data, a means for comparing the counted value and a number of printed marks corresponding to the print information in response to the completion of the extraction, a means for calculating relative quantities of each of the colors and a reference mark color based on the contents of the work register in response to a matching comparison result, a data memory for storing the relative quantities for the plurality of mark groups, and a means for measuring the number of stored extracted mark groups.

The calculation of the relative quantities can be made based on a center of transition points of the leading edge and the trailing edge of the mark pixel region of each color. By obtaining the center address of each mark pixel region based on the address data of the leading and trailing edges of the mark pixel region of each color, it is possible to a mark distance (interval) can be obtained from a difference between center addresses of the reference mark color and each target color, and the mark distance can be measured accurately even if a fluctuation such as thinning of the mark width occurs.

Furthermore, an initial correction mode and a regular correction mode may be provided in the image forming apparatus 1. In the initial correction mode, all of the correction operations are carried out by the print position error correction unit 42 regardless of the magnitude of the correction quantity from the mark image processor 30. On the other hand, in the regular correction mode, the correction operation is selectively carried out by the print position error correction unit 42 only when the correction quantity exceeds a prescribed value.

As a result, at the time when the power of the image forming apparatus 1 is turned ON or the image forming apparatus 1 is activated again after being activated for a time exceeding a predetermined time, all of the correction operations are carried out by the print position error correction unit 42 even if the error quantity is a predetermined value or less. When the image forming apparatus 1 is activated, the error quantity is appropriately detected by recording the CCD marks on the transparent transport belt 18 between the successive recording sheets 10, only if the error quantity exceeds the predetermined value. For this reason, it is possible to maintain the print position error caused by inconsistencies among the individual image forming apparatuses 1 and external disturbances such as that caused by temperature change to a predetermined value or less.

If the CCD marks transferred onto the transparent transport belt 18 are thin or partially missing, there is a possibility that the calculated result will become different from the actual width of the CCD marks. In addition, if foreign substances such as dust particles or dispersed toner powder caused by incomplete mark transfer exist on the transparent transport belt 18, there is a possibility that such foreign substances will be erroneously recognized as CCD marks. In such cases, the print position error will not be corrected effectively even if the print position error correction is carried out based on the erroneously detected CCD marks. Further, the print position error correction based on such erroneously detected CCD marks may further increase the print position error rather than reducing the print position error.

Hence, a description will now be given of a second embodiment of the image forming apparatus according to the present invention having a mark image read unit 41 which can extract the mark pixel region with an improved accuracy.

Figure 16:
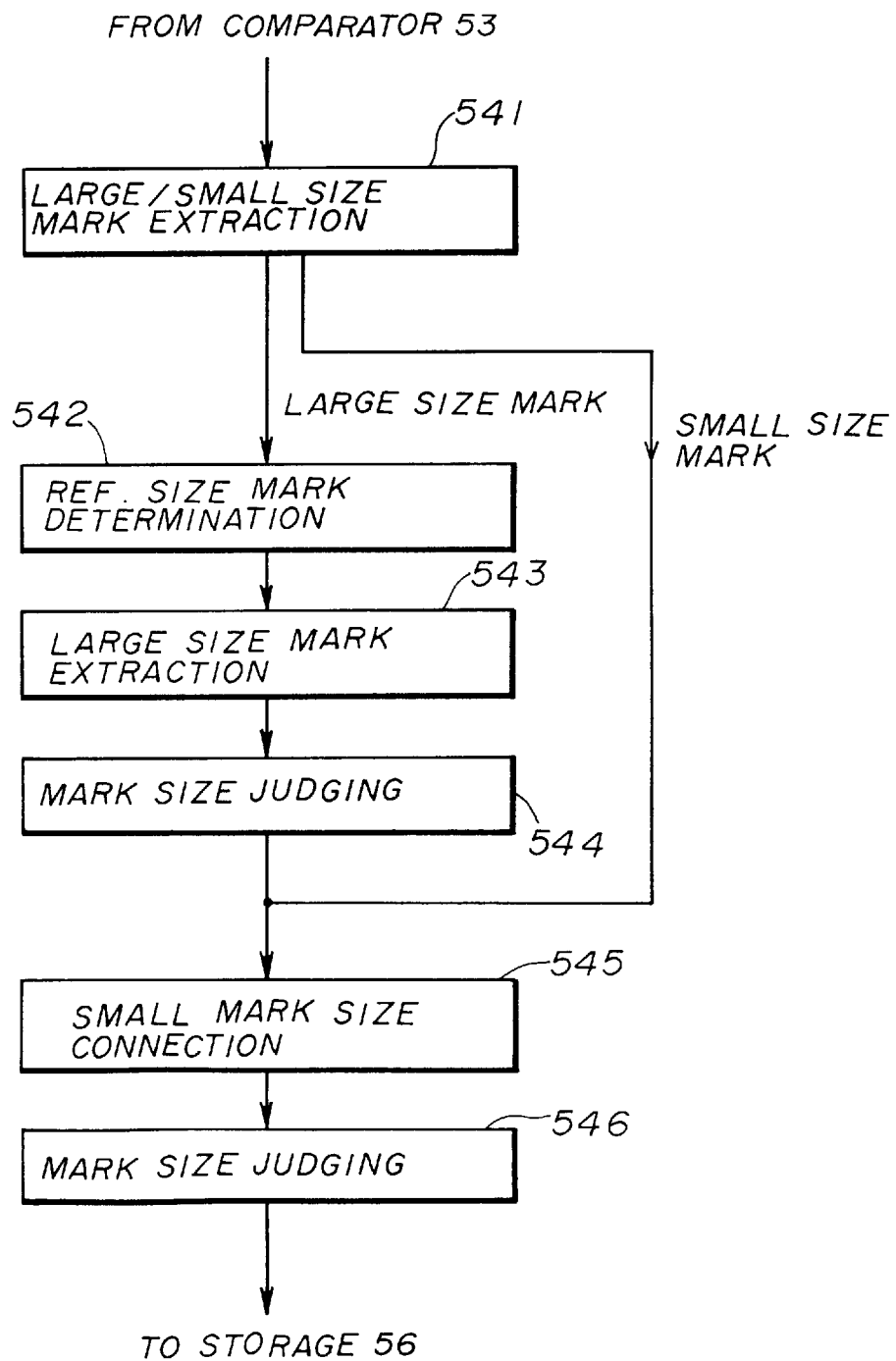
FIG. 16 is a system block diagram showing a part of a mark image reading unit within a mark image processor of a second embodiment of the image forming apparatus according to the present invention.

FIG. 16 is a system block diagram showing a part of the mark image read unit 31 within the mark image processor 30 in this second embodiment. A connection processor 540 shown in FIG. 16 corresponds to the first and second continuous pixel detection units 54 and 55 shown in FIG. 6. In FIG. 16, the mark connection processor 540 includes a large/small size mark extraction unit 541, a reference size mark determination unit 542, a large size mark connection unit 543, a mark size judging unit 544, a small size mark connection unit 545, and a mark size judging unit 546.

The large/small size mark extraction unit 541 of the mark connection processor 540 is made up of 2 filter portions of mutually different types for checking continuity of the non-transmitting pixels, that is, the CCD marks. These 2 filter portions respectively have homeostatis-like characteristics for large and small sizes, so that the continuity of the large size pixels and the continuity of the small size pixels are detected independently. According to the homeostatis-like characteristics of these 2 filter portions, the continuity/discontinuity changes depending on the existence/non-existence of a plurality of successive non-transmitting pixels. For example, the large size checked by the large/small size mark extraction unit 541 is a size of approximately 1 dot, and the small size checked by the large/small size mark extraction unit 541 is a size of approximately ½ dot. When the image data detected by the CCD image sensor 19 are successively read from the first pixel, the mark connection processor 540 uses the above 2 filter portions, and obtains the pixel numbers at both ends of a non-transmitting pixel group which is made up of non-transmitting pixels which are larger than the large size and do not pass through the filter portion and non-transmitting pixels which are larger than the small size but smaller than the large size. The mark connection processor 540 stores these pixel numbers in the pixel data storage 56 shown in FIG. 6 together with a discrimination code for discriminating the start/terminal end and the type (large/small) of filter portion.

In other words, a large size mark and a small size mark are first extracted by the large/small size mark extraction unit 541, and the reference size mark determination unit 542 determines a reference size mark. Accordingly, a reference is made to the large pixel group which is used to detect the main portion of the CCD mark, that is, the start end pixel number of the large filter type stored in the pixel data storage 56. The first start pixel is regarded as having the start end pixel number of the CCD mark, and the pixel adjacent to the right of this first start pixel and having an address 1 greater than the present address is regarded as having the terminal end pixel number.

Next, in the large size mark connection unit 543, a reference is made from the terminal end pixel number of the CCD mark towards the right for $A_1\%$ of the mark width which is actually to be printed (actual printing mark width). The direction towards the right from the terminal pixel number of the CCD mark corresponds to a positive direction in the memory address of the pixel data storage 56. For example, $A_1\%$ is approximately 100% to 150%. If a terminal end pixel number of the large filter type exists, the terminal end pixel number of the CCD mark is unconditionally updated to this terminal pixel number of the large filter type.

In the mark size judging unit 544, the width of the CCD mark connected up to this point in time, that is, a distance from the start end pixel number to the terminal end pixel number, is compared with $A_2\%$ of the actual printing mark width, where $A_2\%$ is approximately 20% to 30%. If the width of the CCD mark connected up to this point in time is less than $A_2\%$ of the actual printing mark width, the mark is not recognized as a CCD mark, and a reference is made to the start end pixel number of the CCD mark from a memory address which is next to the memory address where the reference up to this point in time is ended.

On the other hand, if the width of the CCD mark is $A_2\%$ or greater than the actual printing mark width, a reference is made from the terminal end pixel number of the CCD mark towards the left, that is, in a negative direction in the memory address of the pixel data storage 56, for a range of $A_3\%$ of the actual printing mark width. For example, $A_3\%$ is approximately 100% to 130%. If a start end pixel number of the small filter type exists, the start end pixel number of the CCD mark is unconditionally updated to this start end pixel number of the small filter type.

Next, in the small size mark connection unit 545, a reference is made from the start end pixel number of the CCD mark towards the right for a range of $A_3\%$ of an unprinted mark width. If a terminal end pixel number of the small filter type exists, the terminal end pixel number of the CCD mark is unconditionally updated to this terminal end pixel number of the small filter type.

In the mark size judging unit 546, the width of the CCD mark connected up to this point in time is compared with $A_4\%$ of the actual printing mark width, where $A_4\%$ is approximately 50% to 70%. If the width of the CCD mark connected up to this point in time is $A_4\%$ of the actual printing mark width or less, the mark is not recognized as a CCD mark, and a reference is made to the start end pixel number of the CCD mark from a memory address which is next to the memory address where the reference up to this point in time is ended.

Therefore, by use of the 2 filter portions of the mutually different types, even if foreign substances such as dust particles or dispersed toner powder caused by incomplete mark transfer exist on the transparent transport belt 18, it is possible to positively prevent such foreign substances from being erroneously recognized as CCD marks. For this reason, it is possible to effectively correct the print position error based on the accurately detected CCD marks.

Figure 17:
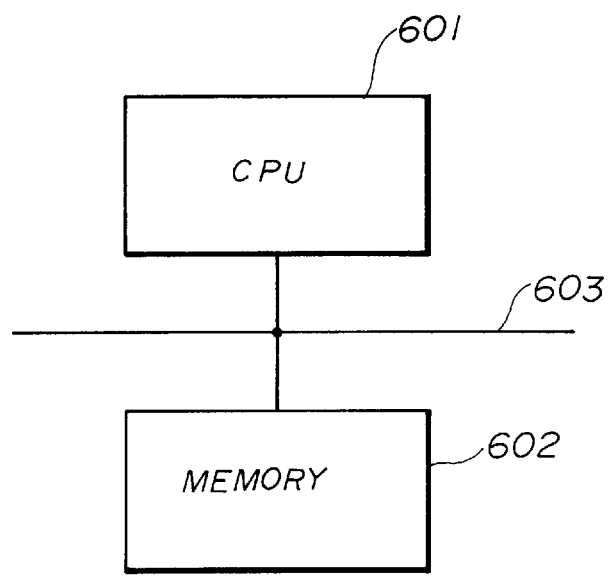
FIG. 17 is a system block diagram showing an embodiment of a connection processor.

The operation of the connection processor 540 described above may be realized by a structure shown in FIG. 17. In FIG. 17, a CPU 601 and a memory 602 are coupled via a bus 603. The memory 602 stores data and programs to be executed by the CPU 601. In this case, the operations of the large/small size mark extraction unit 541, the reference size mark determination unit 542, the large size mark connection unit 543, the mark size judging unit 544, the small size mark connection unit 545 and the mark size judging unit 546 of the mark connection processor 540 become as shown in FIGS. 18 through 24. The memory 602 shown in FIG. 17 may be formed by a portion of the pixel data storage 56 shown in FIG. 6. In addition, it is possible to carry out at least a portion of the operation of the CPU 601 by the microprocessor 58 shown in FIG. 6.

Figure 18:
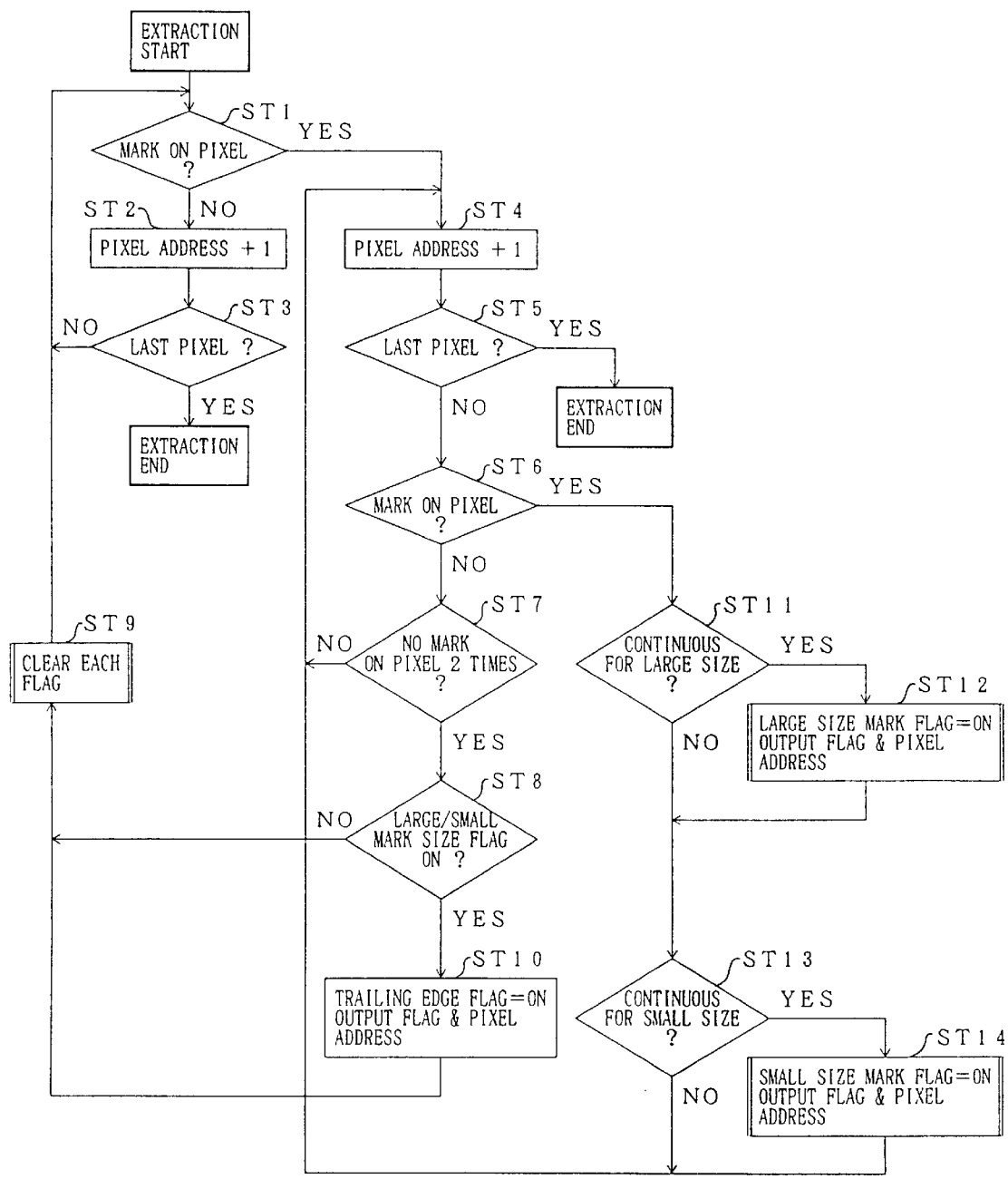
FIG. 18 is a flow chart for explaining the operation of a large/small size mark extraction unit.

FIG. 18 is a flow chart for explaining the extraction process of the large/small size mark extraction unit 541 that is realized by the CPU 601. In FIG. 18, a step ST1 decides whether or not a CCD mark exists on the pixels, and a step ST2 increments the pixel address by "1" if the decision result in the step ST1 is NO. A step ST3 decides whether or not the last pixel is reached, and the process returns to the step ST1 if the decision result in the step ST3 is NO. The extraction process ends if the decision result in the step ST3 is YES.

On the other hand, if the decision result in the step ST1 is YES, a step ST4 increments the pixel address by "1". In addition, a step ST5 decides whether or not the final pixel is reached, and the process advances to a step ST6 if the decision result in the step ST5 is NO. The extraction process ends if the decision result in the step ST5 is YES.

The step ST6 decides whether or not a CCD mark exists on the pixels, and if the decision result in the step ST6 is NO, a step ST7 decides whether or not a state in which no mark exists on the pixels continued for 2 times. The process returns to the step ST4 if the decision result in the step ST7 is NO. If the decision result in the step ST7 is YES, a step ST8 decides whether or not a large/small mark size flag is ON (set). If the decision result in the step ST8 is NO, a step ST9 turns each of the flags OFF (clear or reset), and the process returns to the step ST1. On the other hand, if the decision result in the step ST9 is YES, a step ST10 turns a trailing edge flag ON, and outputs the flags and the pixel address, that is, the memory address of the pixel data storage 56. The process advances to the step ST9 after the step ST10.

If the decision result in the step ST6 is YES, a step ST11 decides whether or not the pixel data are continuous for an amount corresponding to the large size. If the decision result in the step ST1 is YES, a step ST12 turns the large size mark flag ON, and outputs the flags and the pixel address. If the decision result in the step ST11 is NO or after the step ST12, a step ST13 decides whether or not the pixel data are continuous for an amount corresponding to the small size. If the decision result in the step ST13 is YES, a step ST14 turns s small size mark flag ON, and outputs the flags and the pixel address. The process returns to the step ST4 if the decision result in the step ST13 is NO or after the step ST14.

Figure 19:
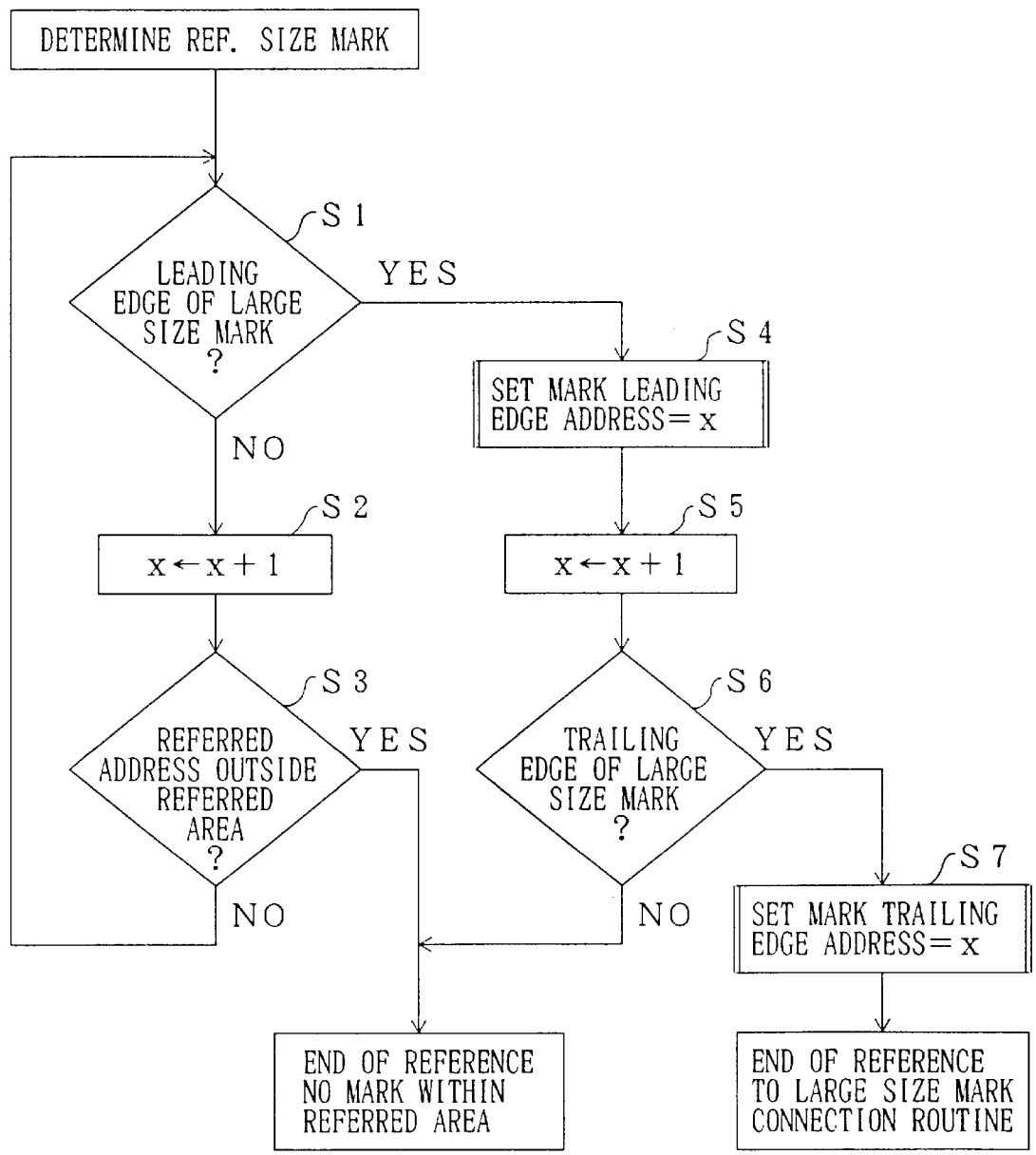
FIG. 19 is a flow chart for explaining the operation of a reference large size mark determination unit.

FIG. 19 is a flow chart for explaining the reference process of the reference size mark determination unit 542 that is realized by the CPU 601. In FIG. 19, a step S1 decides whether or not a leading edge of the large size mark is detected, based on the large size mark and the small size mark obtained from the large/small size mark extraction unit 541. If the decision result in the step S1 is NO, a step S2 increments x by "1". A step S3 decides whether or not a referred address is outside a referred area, and the process returns to the step S1 if the decision result in the step S3 is NO.

On the other hand, if the decision result in the step S1 is YES, a step S4 sets the mark leading edge address to x, and a step S5 increments x by "1". A step S6 decides whether or not the large size mark corresponds to a trailing edge of the mark. If the decision result in the step S6 is NO, it is judged that no mark exists within the referred are, and a step S7 sets the mark trailing edge address to x, and the reference process ends. After the reference process ends, the process advances to the connection process of the large size mark connection unit 543 which will be described later.

A referred area start address is a start memory address of a data memory region within the pixel data storage 56 which stores the mark edge data. On the other hand, the referred area is the referring range in which the reference is made, and a referred area terminal address is a terminal memory address within the pixel data storage 56 indicating the referring range. The referring area start address and the referring area terminal address are input to the reference size mark determination unit 542 from the large/small size mark extraction unit 541, and the reference size mark determination unit 542 outputs the mark leading edge address and the mark trailing edge address.

Figure 20:
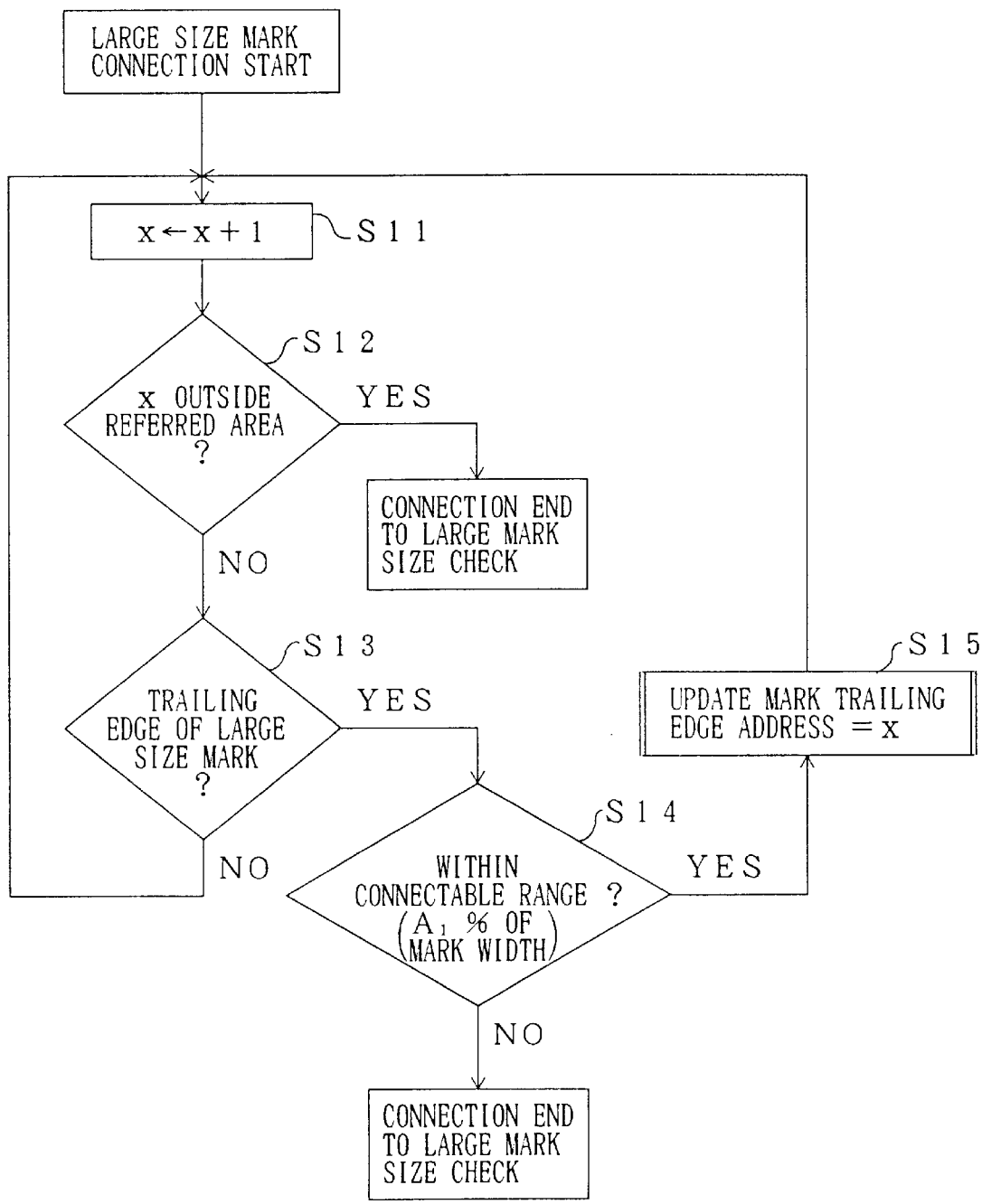
FIG. 20 is a flow chart for explaining the operation of a large size mark connection unit.

FIG. 20 is a flow chart for explaining the connection process of the large size mark connection unit 543 that is realized by the CPU 601. In FIG. 20, a step S11 increments x by "1", and a step S12 decides whether or not x falls outside the referred area. If the decision result in the step S12 is YES, the connection process ends, and the process advances to the large mark size check process of the mark size judging unit 544 which will be described later.

On the other hand, if the decision result in the step S12 is NO, a step S13 decides whether or not the large size mark corresponds to the trailing edge of the mark. The process returns to the step S11 if the decision result in the step S13 is NO. If the decision result in the step S13 is YES, a step S14 decides whether or not the mark is within a connectable range. If the decision result in the step S14 is NO, the connection process ends, and the process advances to the large mark size check process of the mark size judging unit 544 which will be described later. More particularly, the step S14 decides whether or not the mark is within the range of $A_1\%$ of the actual printing mark width, where $A_1\%$ is approximately 100% to 150%, for example. If the decision result in the step S14 is YES, a step S15 updates the mark trailing edge address to x, and the process returns to the step S11.

Figure 21:
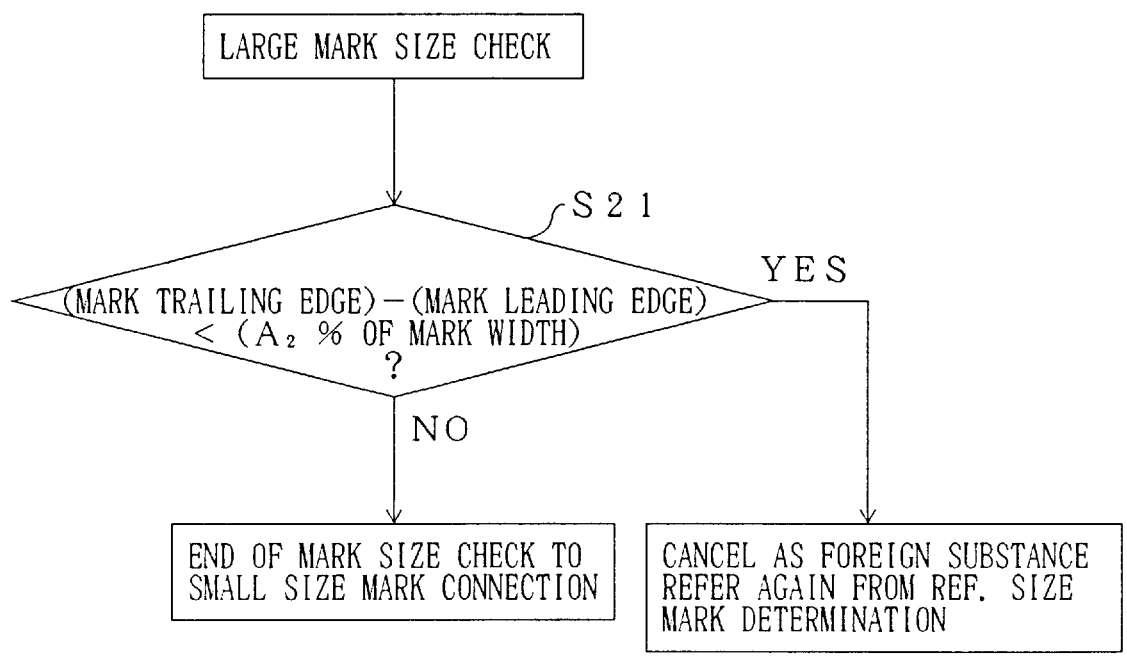
FIG. 21 is a flow chart for explaining the operation of a mark size judging unit.

FIG. 21 is a flow chart for explaining the large mark size check process of the mark size judging unit 544 that is realized by the CPU 601. In FIG. 21, a step S21 decides whether or not the distance from the mark trailing edge to the mark leading edge is $A_2\%$ of the actual printing mark width or less, where $A_2\%$ is approximately 20% to 30%, for example. If the decision result in the step S21 is YES, the mark is cancelled as a foreign substance, and the process again returns to the reference process of the reference size mark determination unit 542. On the other hand, if the decision result in the step S21 is NO, the large mark size check process ends, and the process advances to the small size mark connection process of the small size mark connection unit 545 which will be described later. By the large mark size check process shown in FIG. 21, it is possible to prevent the foreign substances such as dust particles from being erroneously recognized as the mark.

Figure 22:
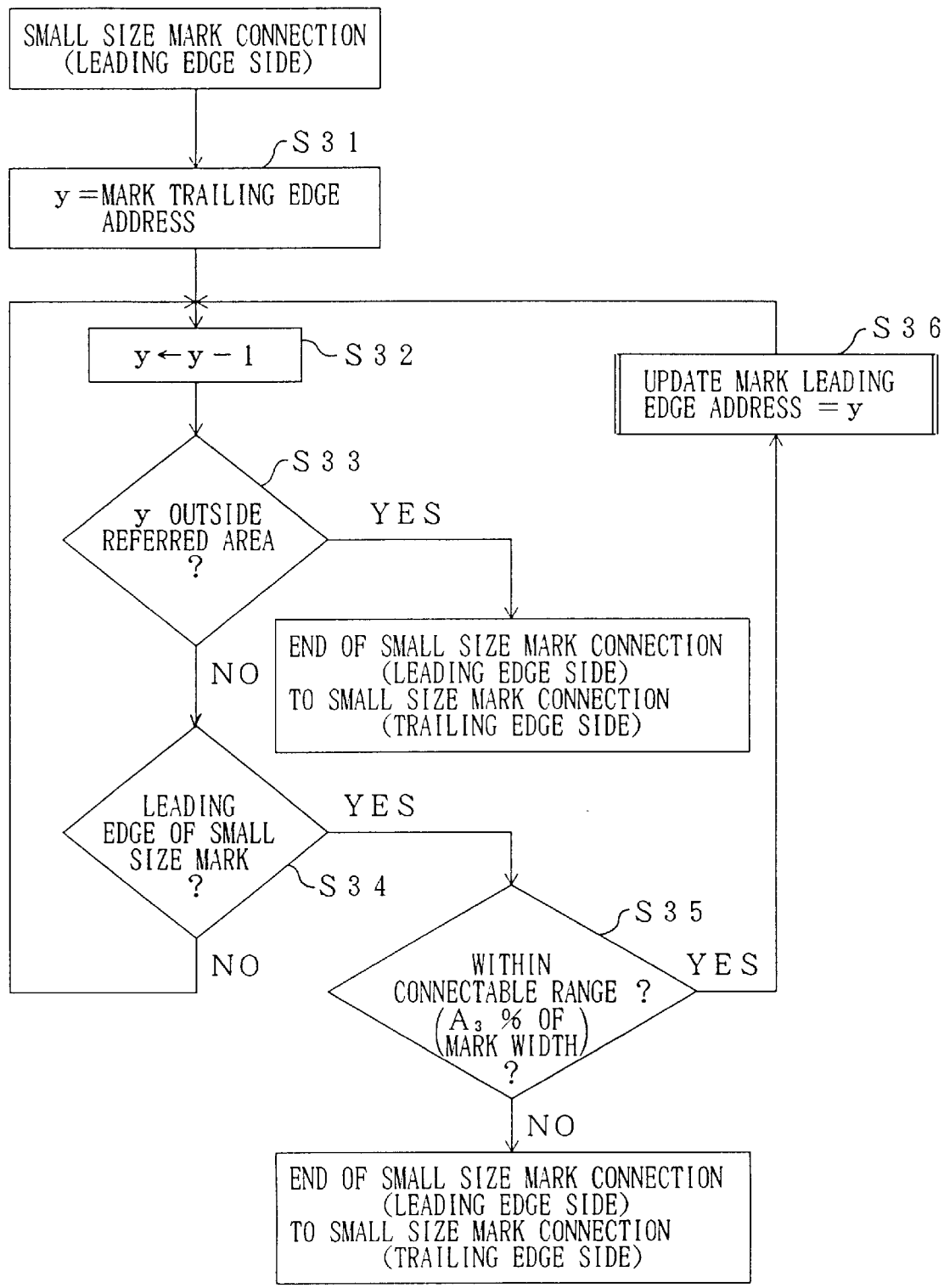
FIG. 22 is a flow chart for explaining the operation of a small size mark connection unit.

FIG. 22 is a flow chart for explaining the connection process for the leading edge side of the small size mark connection unit 545 that is realized by the CPU 601. In FIG. 22, a step S31 sets the mark trailing edge address to y, and a step S32 decrements Y by "1". A step S33 decides whether or not y falls outside the referred area. If the decision result in the step S33 is YES, the connection process for the leading edge side ends, and the process advances to the connection process for the trailing edge side of the small size connection unit 545 which will be described later.

On the other hand, if the decision result in the step S33 is NO, a step S34 decides whether or not the mark corresponds to the small size mark leading edge. The process returns to the step S32 if the decision result in the step S34 is NO. If the decision result in the step S34 is YES, a step S35 decides whether or not the mark is within a connectable range. If the decision result in the step S35 is NO, the connection process for the leading edge side ends, and the process advances to the connection process for the trailing edge side of the small size connection unit 545 which will be described later. More particularly, the step S35 decides whether or not the mark is $A_3\%$ of the actual printing mark width or less, where $A_3\%$ is approximately 100% to 130%, for example. If the decision result in the step S35 is YES, a step S36 updates the mark leading edge address to y, and the process returns to the step S32.

Figure 23:
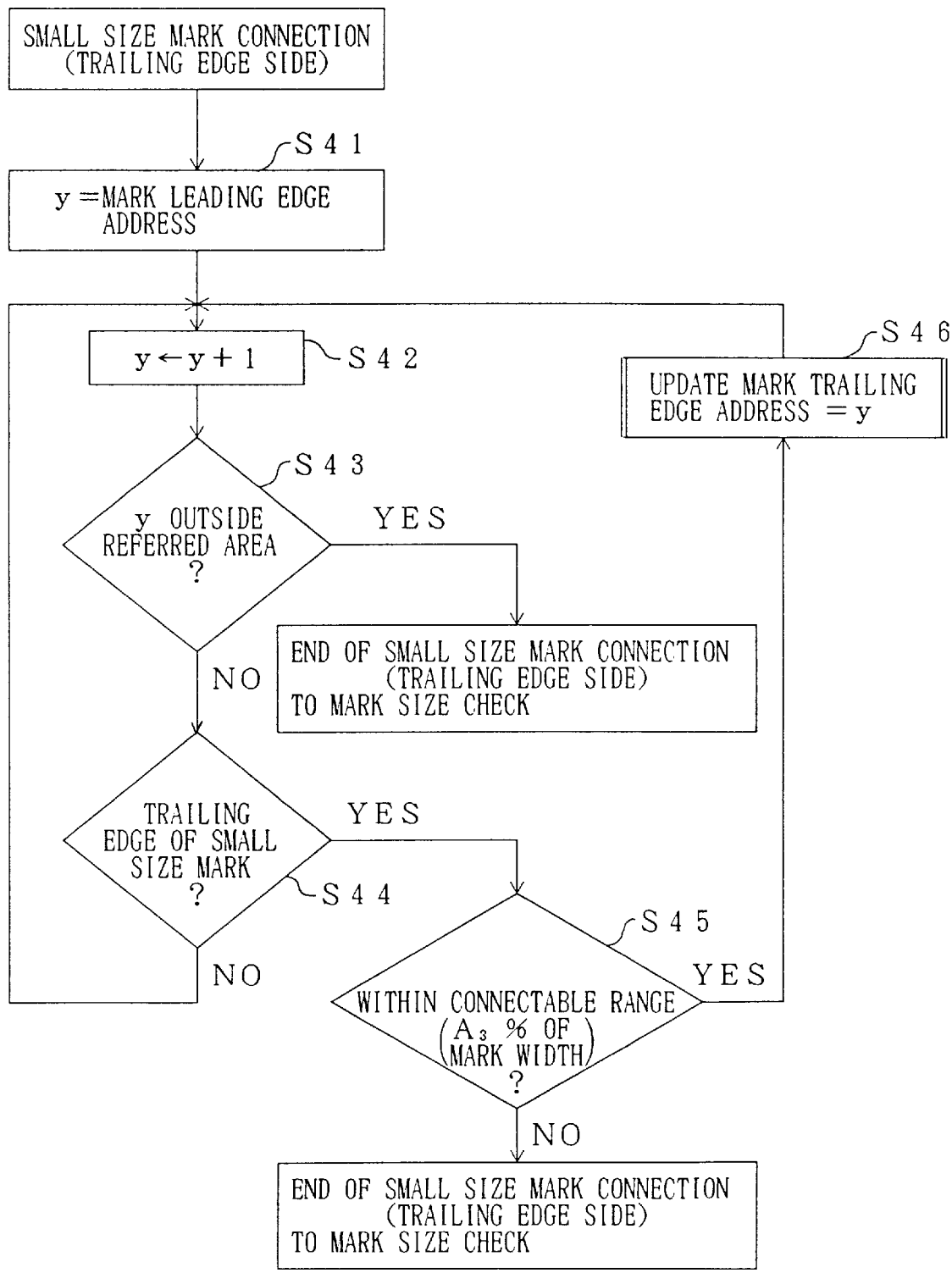
FIG. 23 is a flow chart for explaining the operation of the small size mark connection unit.

FIG. 23 is a flow chart for explaining the connection process for the trailing edge side of the small size mark connection unit 545 that is realized by the CPU 601. In FIG. 23, a step S41 sets the mark leading edge address to y, and a step S42 increments Y by "1". A step S43 decides whether or not y falls outside the referred area. If the decision result in the step S43 is YES, the connection process for the trailing edge side ends, and the process advances to the small size check process of the mark size judging unit 546 which will be described later.

On the other hand, if the decision result in the step S43 is NO, a step S44 decides whether or not the mark corresponds to the small size mark trailing edge. The process returns to the step S42 if the decision result in the step S44 is NO. If the decision result in the step S44 is YES, a step S45 decides whether or not the mark is within a connectable range. If the decision result in the step S45 is NO, the connection process for the trailing edge side ends, and the process advances to the small mark size check process of the mark size judging unit 546 which will be described later. More particularly, the step S45 decides whether or not the mark is $A_3\%$ of the actual printing mark width or less, where $A_3\%$ is approximately 100% to 130%, for example. If the decision result in the step S45 is YES, a step S46 updates the mark trailing edge address to y, and the process returns to the step S42.

Figure 24:
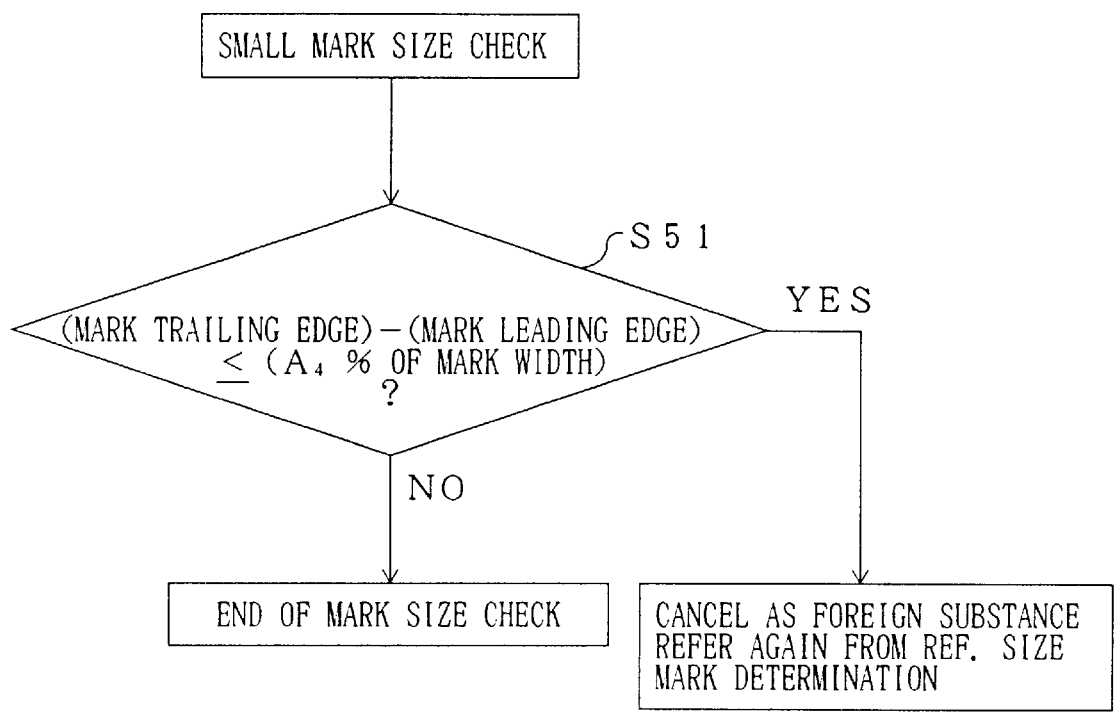
FIG. 24 is a flow chart for explaining the operation of a mark size judging unit.

FIG. 24 is a flow chart for explaining the small mark size check process of the mark size judging unit 546 that is realized by the CPU 601. In FIG. 24, a step S51 decides whether or not a distance from the mark trailing edge to the mark leading edge is $A_4\%$ of the actual printing mark width or less, where $A_4\%$ is approximately 50% to 70%, for example. If the decision result in the step S51 is YES, the mark is cancelled as being a foreign substance, and the process again returns to the reference process of the reference size mark determination unit 542. On the other hand, if the decision result in the step S51 is NO, the small mark size check process ends, and the process of the mark connection processor 540 ends. By the small mark size check process shown in FIG. 24, it is possible to prevent the foreign substances such as dust particles from being erroneously recognized as CCD marks.

Figure 25:
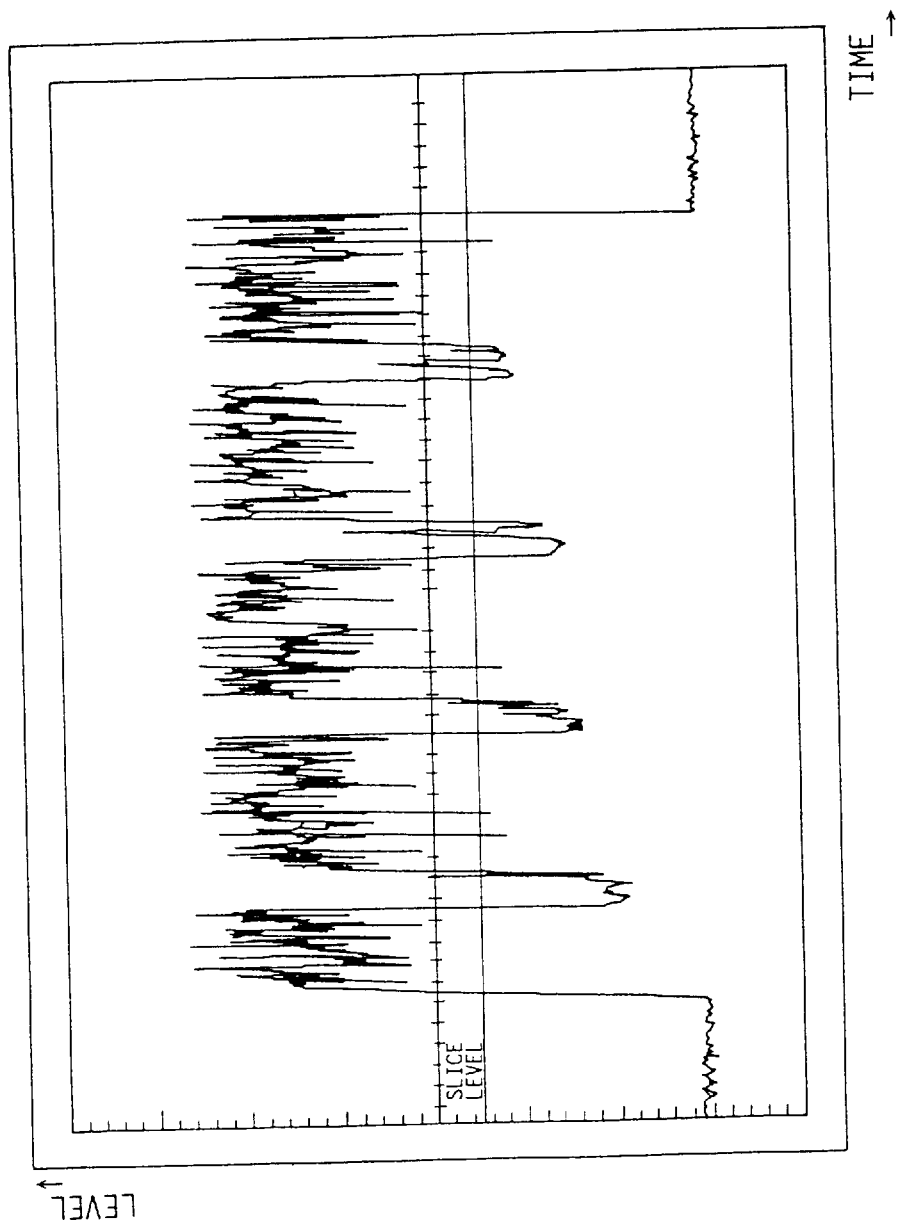
FIG. 25 is a diagram showing an example of a detection output corresponding to CCD marks detected by the CCD image sensor.

FIG. 25 is a diagram showing an example of a detection output corresponding to CCD mark detected by the CCD image sensor 19. In FIG. 25 and FIGS. 26 through 28 which will be described later, the ordinate indicates the signal level and the abscissa indicates the time, respectively, in arbitrary units.

Figure 26:
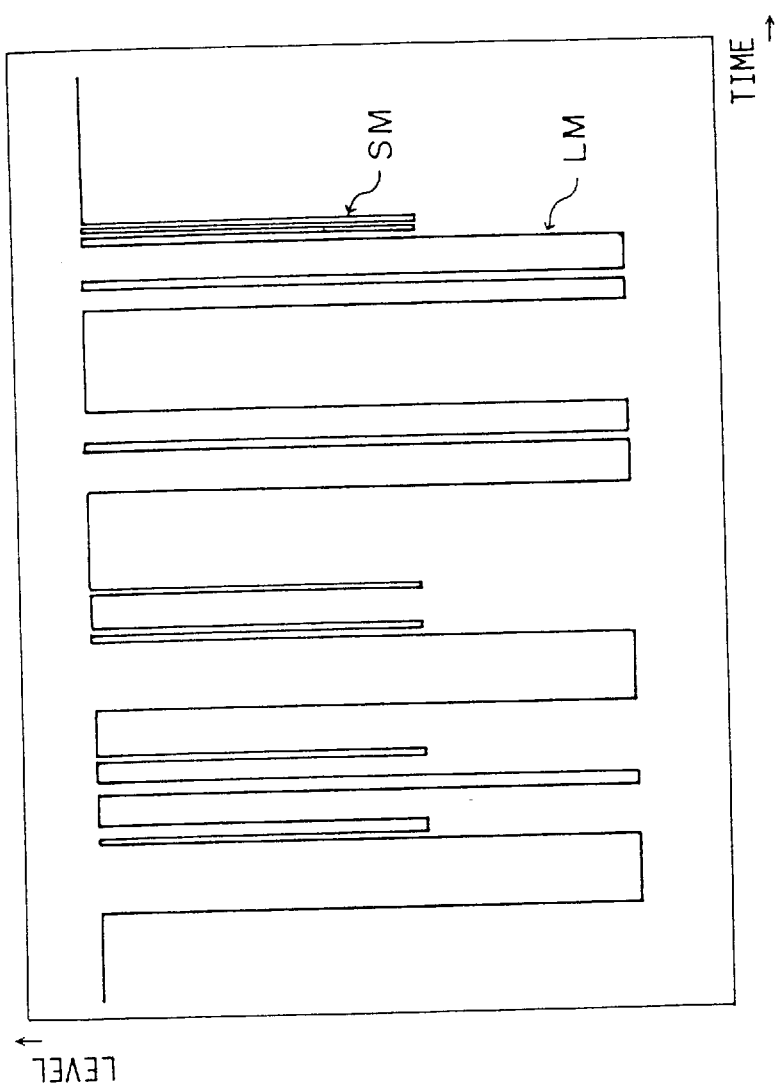
FIG. 26 is a diagram showing a signal pattern which is obtained by processing the detection output shown in FIG. 25 by the large/small size mark extraction unit.

FIG. 26 is a diagram showing a signal pattern which is obtained by processing the detection output shown in FIG. 25 by the large/small size mark extraction unit 541 of the mark connection processor 540. In FIG. 26, an extracted large size mark is indicated by LM, and an extracted small size mark is indicated by SM.

Figure 27:
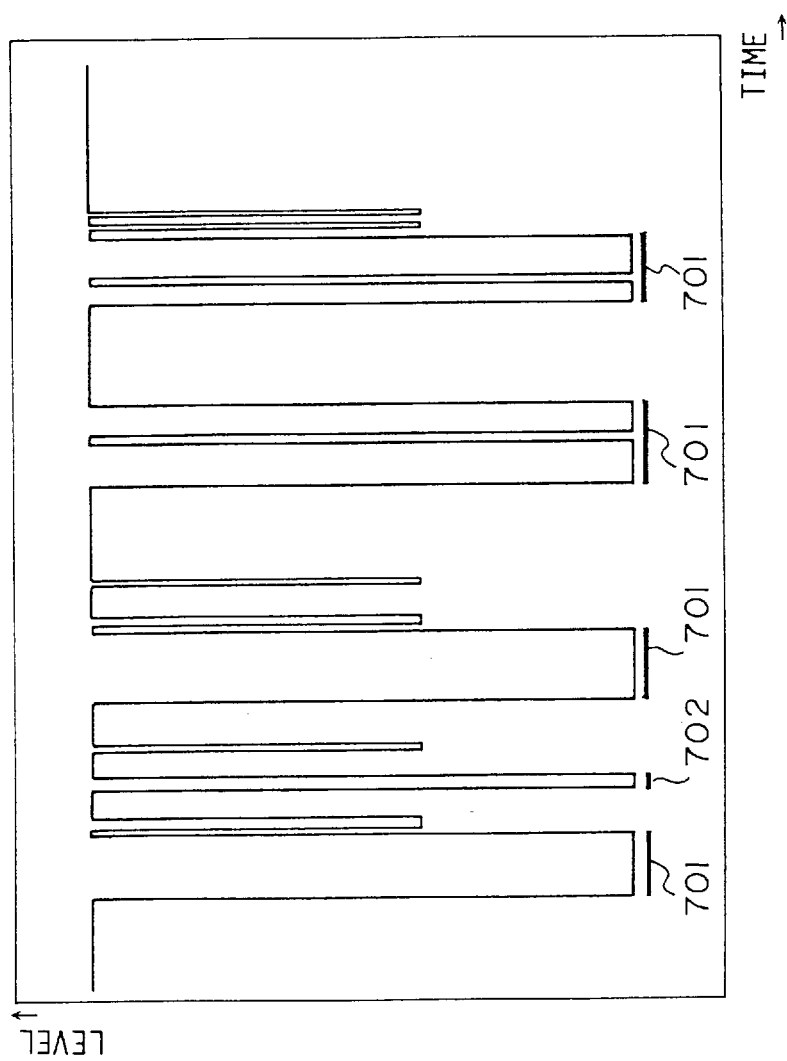
FIG. 27 is a diagram showing a signal pattern which is obtained by processing the signal pattern shown in FIG. 26 by the large size mark connection unit.

FIG. 27 is a diagram showing a signal pattern which is obtained by processing the signal pattern shown in FIG. 26 by the large size mark connection unit 543 of the mark connection processor 540. In FIG. 27, a bold line 701 indicates a width of large size mark portions which are connected by the large size mark connection unit 543, and a bold line 702 indicates a width of portions which are excluded from the large size mark by the mark size judging unit 544 of the mark connection processor 540.

Figure 28:
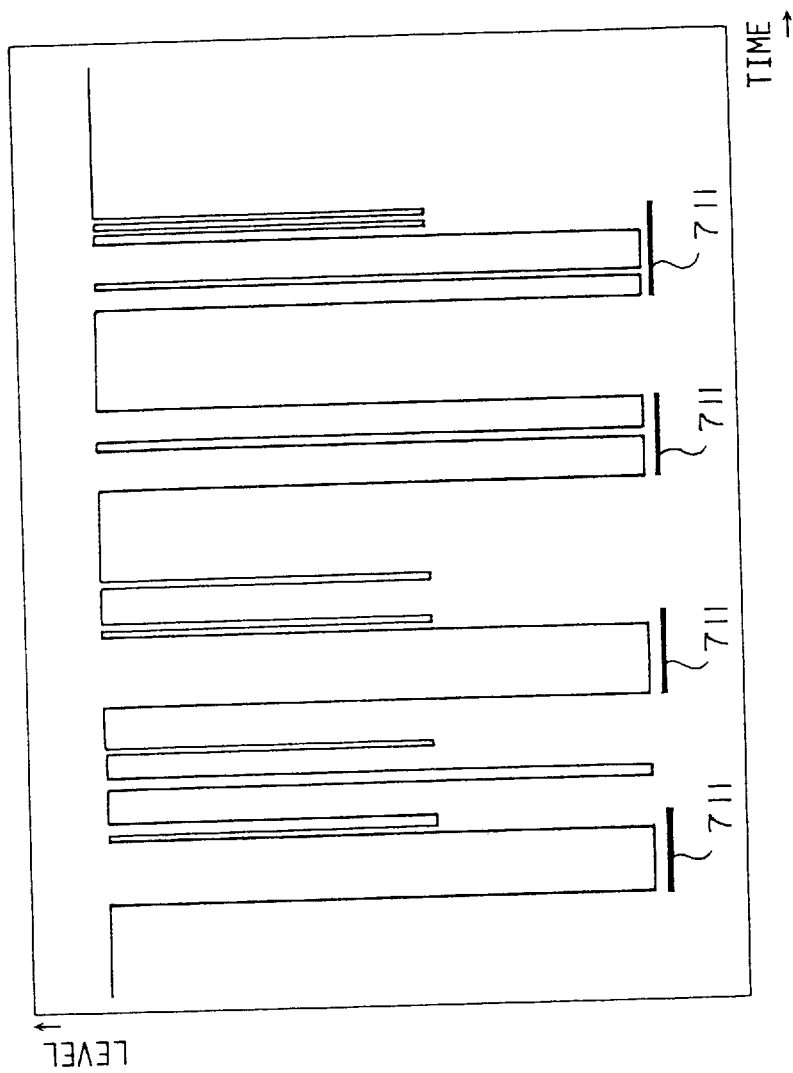
FIG. 28 is a diagram showing a signal pattern which is obtained by processing the signal pattern shown in FIG. 27 by the small size mark connection unit.

FIG. 28 is a diagram showing a signal pattern which is obtained by processing the signal pattern shown in FIG. 27 by the small size mark connection unit 545 of the mark connection processor 540. In FIG. 28, a bold line 711 indicates a width of the large/small size mark portions which are connected by the small size mark connection unit 545. The portions indicated by the bold line 702 shown in FIG. 27 and excluded from the large size mark are regarded as foreign substances and are excluded from the large/small size mark portions which are connected in the mark size judging unit 546.

Therefore, according to the second embodiment, it is possible to further improve the extraction accuracy of the mark pixel region in the mark image read unit 31. As a result, even if the CCD marks printed on the transparent transport belt 18 are partially missing or thin, a result different from the actual mark width will not be calculated. In addition, even if foreign substances such as dust particles or dispersed toner powder caused by incomplete mark transfer exist on the transparent transport belt 18, the foreign substances or dispersed toner powder will not be erroneously recognized as CCD marks. For this reason, it is possible to effectively correct the print position error when the print position error correction is made based on the detected CCD marks.

If the operation of correcting the print position error is carried out immediately before the printing with respect to the recording sheet, it takes a relatively long time until the printing with respect to the first recording sheet is started from a state where the mechanisms within each recording units of the image forming apparatus are stationary. In addition, when continuously carrying out the printing with respect to a plurality of recording sheets, the operation of correcting the print position error must be carried out while transferring the CCD marks on the transparent transport belt between two successive recording sheets. As a result, although the correction accuracy with respect to the print position error improves, the printing speed of the image forming apparatus as a whole slightly deteriorates as a result depending on the time required for the correction operation.

Figure 29:
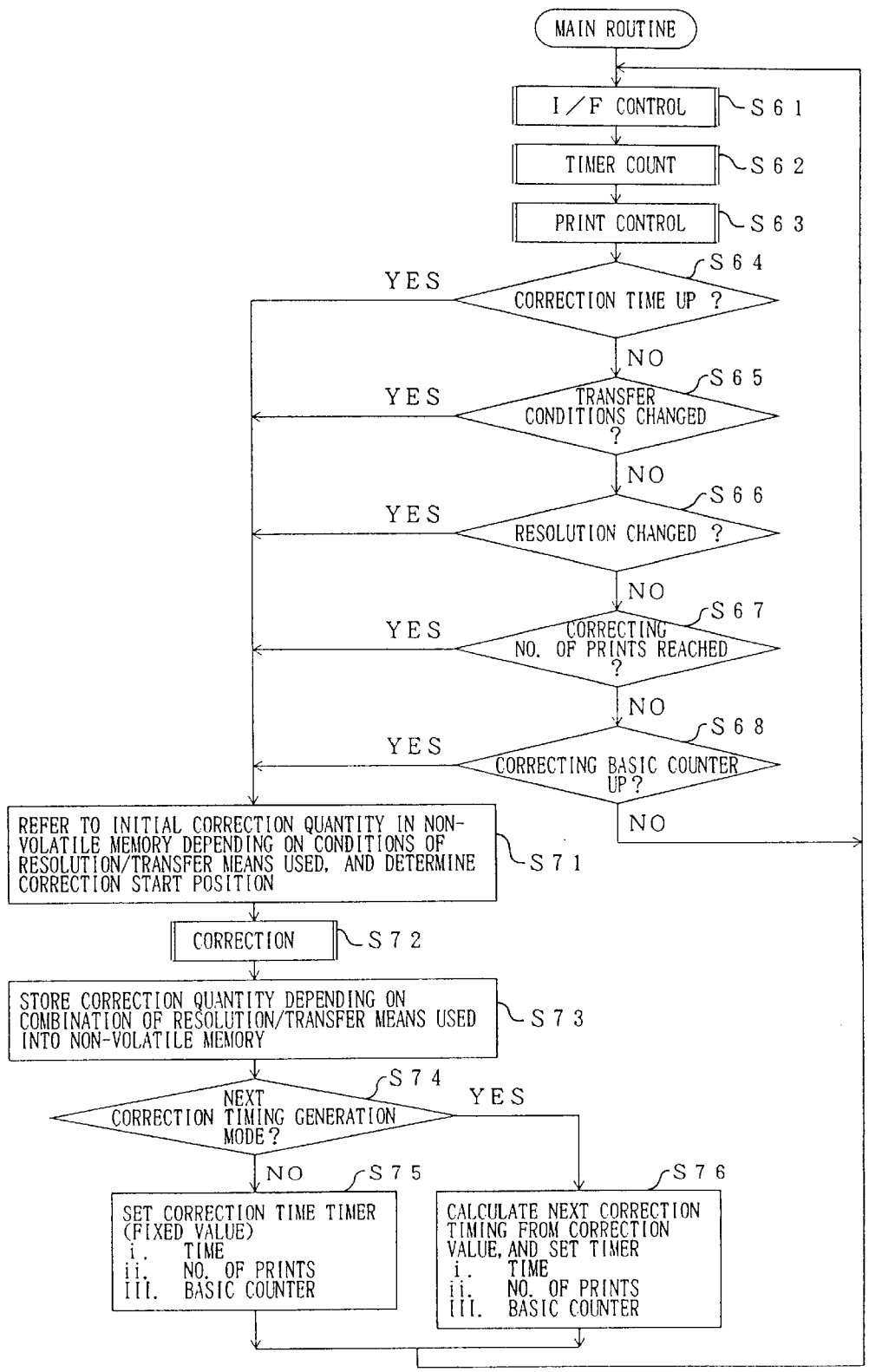
FIG. 29 is a flow chart for explaining the operation of the mark image processor of a third embodiment of the image forming apparatus according to the present invention.

Next, a description will be given of a third embodiment of the image forming apparatus according to the present invention which can suppress the deterioration of the printing speed of the image forming apparatus as a whole that is caused by the operation of correcting the print position error, by referring to FIG. 29. FIG. 29 is a flow chart for explaining the operation of the mark image processor of the third embodiment of the image forming apparatus. The process shown in FIG. 29 corresponds to the operation of the main control unit 17 shown in FIG. 3, that is, the operation of the microprocessor 58 of the mark image processor 30 shown in FIGS. 5 and 6.

In FIG. 29, a step S61 controls an interface (I/F) with respect to the image forming apparatus 1, and a step S62 starts a count of a timer. A step S63 starts a print control of each of the recording units U1 through U4 within the image forming apparatus 1. The print control includes management of the number of recording sheets 10 to be printed, management of a basic counter which will be described later, management of printing conditions and the like.

A step S64 decides whether or not a time managed by a correction time timer is up. The correction time timer manages the times when the correction operation with respect to the print position error becomes necessary due to various causes that are generated during operation of the image forming apparatus 1.

In a case where a plurality of transfer means such as photoconductive drums are provided to transfer images, and the number and combinations of the transfer means to be used can be changed depending on the color of the image to be printed or the like, it is desirable to carry out the above described correction operation with respect to the print position error every time the transfer conditions are changed. Hence, if the decision result in the step S64 is NO, a step S65 decides whether or not thetransfer conditions are changed.

Similarly, in a case where the resolution of the transfer means to be used can be changed, it is desirable to carry out the above described correction operation with respect to the print position error every time the resolution is changed. Thus, if the decision result in the step S65 is NO, a step S66 decides whether or not the resolution is changed.

The time when the correction operation with respect to the print position error becomes necessary an be predicted based on the number of recording sheets 10 printed. Accordingly, if the decision result in the step S66 is NO, a step S67 decides whether or not the number of recording sheets 10 printed has reached a number that requires the correction operation.

The time when the correction operation with respect to the print position error becomes necessary can be predicted managing by use of the basic counter the number of revolutions made by the photoconductive drum, the number of revolutions made by the transparent transport belt 18, or the running (or operating) times of the photoconductive drum and the transparent transport belt 18. Hence, if the decision result in the step S67 is NO, a step S68 decides whether or not a time which requires the correction operation and is managed by the basic counter is up. The process returns to the step S61 if the decision result in the step S68 is NO.

If the decision result in one of the steps S64 through S68 is YES, the process advances to step S71 so as to start the correction operation. The step S71 reads an initial correction quantity from a non-volatile memory means within the main control unit 17, and determines a correction start position depending on the resolution, the conditions of the transfer means to be used and the like. In this case, the initial correction quantity is stored in the non-volatile memory means by carrying out a correction operation in advance. For example, the non-volatile memory means may be formed by the pixel data storage 56 shown in FIG. 6.

A step S72 carries out the correction operation described above in conjunction with FIGS. 2 through 15.

A step S73 stores the correction quantity in he non-volatile memory means for every condition of se such as the resolution and the combination of the transfer means to be used.

A step S74 decides whether or not a next correction timing generation mode is reached. If the decision result in the step S74 is NO, a step S75 sets the correction time timer in units of the time, the number of prints or the basic counter. On the other hand, if the decision result in the step S74 is YES, a step S76 calculates the next correction timing from the correction quantity stored in the non-volatile memory means, and sets the correction time timer in units of the time, the number of prints or the basic counter.

In other words, by storing the correction quantity in the non-volatile memory means every time the correction operation is carried out, it is possible to read and use the stored correction quantity when obtaining the present correction quantity, so that the correction operation is suppressed to a minimum and the correction time is reduced. For example, when it is assumed for the sake of convenience that the transfer position error is dependent on the time and a limit value requiring the correction is 50 $\mu$m, it may be judged that the error quantity per 1 minute is 1 $\mu$m if the error quantity after 10 minutes from the first correction operation is 10 $\mu$m. In this case, the error of 50 $\mu$m occurs after approximately 50 minutes. Hence, the next correction operation is carried out after 40 minutes, for example, by taking into consideration a margin with respect to the 50 minutes. By carrying out such a process for every correction operation, it is possible to improve the transfer accuracy by reducing the transfer error with respect to the time, and an efficient correction process becomes possible by a minimum correction operation.

The process returns to the step S61 after the step S75 or the step S76.

Therefore, according to the third embodiment, it is possible to shorten the correction process by preventing unnecessary correction operation, because the correction is made at predetermined correction timings and the correction quantity used for the correction is stored in the nonvolatile memory means. For this reason, it is possible to improve the efficiency of the correction process, and it is possible to prevent the printing speed from greatly deteriorating due to the correction operation.

Of course, the present invention is applicable to various kinds of image forming apparatuses including printers, copying machines and facsimile machines.

Further, the present invention is not limited to these embodiments, but various variations and modifications may be made without departing from the scope of the present invention.

What is claimed is:

1. An image forming apparatus comprising:
   a plurality of image bearing members bearing latent images;
   image forming means for forming the latent images on said image bearing members;
   developing means for developing the latent images on said image bearing members;
   transport means for transporting a transfer member on which images of different colors developed by said developing means are successively transferred as the transfer member is transported;
   image pickup elements, arranged obliquely to a main scan direction of said image forming means and located on a downstream of a most downstream one of said image bearing members along a direction in which said transport means transports the transfer member, said image pickup elements detecting as image information transmitted or reflected light quantity distributions of regions which include marks transferred on said transport means from said image bearing members; and
   correction means for detecting correction quantities from error quantities of marks transferred from the image bearing members other than a reference image bearing member with respect to a reference mark transferred from the reference image bearing member based on the image information detected by said image pickup elements, and correcting positions of the latent images formed on the image bearing members other than the reference image bearing member depending on the correction quantities.

2. The image forming apparatus as claimed in claim 1, wherein said image bearing members alternately transfer at least two kinds of mark groups on said transfer member in order to detect position errors in the main scan direction and a sub scan direction of the latent images formed on the image bearing members, said sub scan direction being perpendicular to said main scan direction.

3. The image forming apparatus as claimed in claim 1, which further comprises:
   correction mode switching means for selectively switching between two correction modes including a first correction mode in which two or more kinds mark groups for detecting image position errors in the main and sub scan directions are alternately transferred on said transport means, and a second correction mode in which a continuous transfer is made on said transport means for every mark.

4. The image forming apparatus as claimed in claim 1, which further comprises:
   means for detecting a continuity of a number of pixels by successively reading light quantities of the image information in units of pixels and comparing the read light quantities with a reference light quantity; and
   means for storing transition points where values indicating the transmitted or reflected light quantities change from a large value to a small value or vice versa together with types of each of the transition points.

5. The image forming apparatus as claimed in claim 4, which further comprises:
   means for counting a number of times the transition points are detected by said image pickup elements; and
   means for invalidating the image information of a mark group if a counted value of the transition points after detection of the image information by said image pickup elements is completed falls outside a preset range.

6. The image forming apparatus as claimed in claim 4, which further comprises:
   means for counting a number of times the transition points are detected by said image pickup elements; and
   means for adjusting a set value of the reference light quantity so that a counted value of the transition points after detection of the image information by said image pickup elements is completed falls within a preset range.

7. The image forming apparatus as claimed in claim 4, which further comprises:
   means for detecting continuity of pixels of a large size and continuity of pixels of a small size.

8. The image forming apparatus as claimed in claim 4, which further comprises:
   first means for detecting a large size pixel of a main mark portion;
   second means for detecting a small size pixel of a mark edge portion; and
   storage means for storing information including kinds of the large and small size pixels together, and the types of the transition points.

9. The image forming apparatus as claimed in claim 8, wherein said first means detects the large size pixel with reference to a value which is approximately ⅓ to ⅙ of a mark width, and said second means detects the small size pixel with reference to a value which is approximately 10 to 30 $\mu$m.

10. The image forming apparatus as claimed in claim 8, which further comprises:
    first and second mark pixel region extraction means for specifying positions of mark pixels by reading the information from said storage means,
    said first mark pixel region extraction means extracting a pixel region of the main mark portion,
    said second mark pixel region extraction means extracting a pixel region of the mark edge portion.

11. The image forming apparatus as claimed in claim 10, which further comprises:
    means for calculating the correction quantities from a correspondence of a plurality of mark pixel regions extracted by said first and second mark pixel region extraction means with a mark of a predetermined color.

12. The image forming apparatus as claimed in claim 11, which further comprises:
    means for invalidating image information of the extracted mark group if a number of marks printed based on the print information does not match a number of mark pixel regions extracted by said first and second mark pixel region extraction means.

13. The image forming apparatus as claimed in claim 10, wherein said first mark pixel region extraction means starts to refer to a large size pixel region in the data stored in said storage means, detects a portion of one mark pixel region from transition points and type included in the data that is first referred, and until a distance between a following large size pixel region and a previous pixel region exceeds a prescribed number of pixels, successively connects second and subsequent large size pixel regions which are next referred to the previous pixel region for replacement as a single pixel region.

14. The image forming apparatus as claimed in claim 10, wherein said second mark pixel region extraction means starts to refer to a small size pixel region in the data in a reverse direction based on a transition point address of a leading edge of a mark pixel region extracted by said first mark pixel region extraction means, and if the small size pixel region exists and until a distance between this small size pixel region and a previous pixel region exceeds a prescribed number of pixels, successively connects second and subsequent small size pixel regions which are next referred to the previous pixel region for replacement as a single pixel region.

15. The image forming apparatus as claimed in claim 10, wherein said second mark pixel region extraction means starts to refer to a small size pixel region in the data in a forward direction based on a transition point address of a trailing edge of a mark pixel region extracted by said first mark pixel region extraction means, and if the small size pixel region exists and until a distance between this small size pixel region and a previous pixel region exceeds a prescribed number of pixels, successively connects second and subsequent small size pixel regions which are next referred to the previous pixel region for replacement as a single pixel region.

16. The image forming apparatus as claimed in claim 10, which further comprises:
    means for counting a number of data based on the mark pixel regions a corresponding color extracted by said first and second mark pixel region extraction means, and comparing a counted value and a number of printed marks corresponding to the print information in response to a completion of the extraction by said first and second mark pixel region extraction means; and calculation means for calculating relative quantities of the marks of each color that are extracted and a reference mark color for a plurality of mark groups in response to a matching comparison result.

17. The image forming apparatus as claimed in claim 16, wherein said calculation means calculates the relative quantities are calculated based on a center of transition points of leading and trailing edges of the mark pixel region of each color.

18. The image forming apparatus as claimed in claim 16, which further comprises:

means for counting a number of times mark groups are extracted;

means for obtaining an average value of relative quantities amounting to the extracted number of mark groups for each color by excluding at least two values indicating maximum and minimum values when a counted value reaches a preset value; and means for calculating an error quantity between each color and a reference mark color based on the average value and a reference value, and calculating the correction quantity for each color based on the error quantity.

19. The image forming apparatus as claimed in claim 1, wherein the correction quantity used by said correction means to correct a print start position error in the main scan direction is made up of a first correction value and a second correction value, said first correction value being in units of a printing density, said second correction value being in units of sections which are obtained by dividing the printing density, said second correction value being less than or equal to a number of sections and forming a delay.

20. The image forming apparatus as claimed in claim 1, wherein the correction quantity used by said correction means to correct a print start position error in a sub scan direction is made up of a first correction value and a second correction value, said first correction value being in units of a printing density, said second correction value being in units of sections which are obtained by dividing the printing density, said second correction value being less than or equal to a number of sections and forming a delay, said sub scan direction being perpendicular to the main scan direction.

21. The image forming apparatus as claimed in claim 1, which further comprises:

means for dividing a print region into one or more sections in the main scan direction, and printing a mark group at start and terminal ends of each section, said mark group having marks of each of the colors arranged therein for detecting a position error;

the correction quantity used by said correction means with respect to a printing width to correct a print width error being formed solely by a value in units of sections which are obtained by dividing a printing density, when a number of each of the sections is two or greater, said correction means calculating the correction quantity of a first section depending on an error quantity of the first section, and calculating the correction quantity of a second and subsequent section by adding the correction quantity of a previous section to the correction quantity which is calculated from an error quantity of a present section.

22. The image forming apparatus as claimed in claim 1, which has an initial correction mode and a regular correction mode, in said initial correction mode all correction operations being carried out by said correction means regardless of a magnitude of the correction quantity, in said regular correction mode the correction operation being selectively carried out by said correction means only when the correction quantity exceeds a prescribed value.

23. The image forming apparatus as claimed in claim 1, wherein said correction means comprises:

mark image read means including storage means and continuous pixel detection means, said continuous pixel detection means successively reading light quantities of image information in units of pixels, detecting a continuity of the pixels from a comparison result between the read light quantities and a reference light quantity, and storing in said storage means, as transition point pixel data, transition points where a transmitted or reflected light quantity changes from a large value to a small value or vice versa together with a type of each of the transition points, said continuous pixel detection means including filter means for detecting the continuity of the pixels independently for a continuity of large size pixels and a continuity of small size pixels.

24. The image forming apparatus as claimed in claim 23, wherein said continuous pixel detection means regards a continuity of the large size pixels as one mark by connecting the large size pixels in a range having a predetermined proportion to a width of the mark transferred on said transport means.

25. The image forming apparatus as claimed in claim 24, wherein said continuous pixel detection means invalidates the image information of the mark if a region between the transition points in the continuity of the connected size pixels is less than or equal to the range having the predetermined proportion to the width of the mark transferred on said transport means.

26. The image forming apparatus as claimed in claim 24, wherein said continuous pixel detection means uses a continuity of the connected large size pixels as a reference region, and regards a continuity of the small size pixels existing in a vicinity of the reference region as a single mark by connecting the small size pixels in a range having a predetermined proportion to the width of the mark transferred on said transport means.

27. The image forming apparatus as claimed in claim 26, wherein said continuous pixel detection means invalidates the image information of the mark if a region between the transition points in the continuity of the connected large size pixels and a region between the transition points in the continuity of the connected small size pixels respectively are less than or equal to the range having the predetermined proportion to the width of the mark transferred on said transport means.

28. The image forming apparatus as claimed in claim 23, wherein said image forming means forms latent images of a plurality of marks on said image bearing members within a detectable range in which said image pickup elements can detect image information, and said mark image read means stores in said storage means pixel data of transition points with respect to the image information of said plurality of marks.

29. The image forming apparatus as claimed in claim 1, which further comprises:

non-volatile memory means, said correction means carrying out the correction at a predetermined correction timing and storing the correction quantities used for said correction in said non-volatile memory means.

30. The image forming apparatus as claimed in claim 29, wherein said correction means determines the predetermined correction timing based on a number of transfer members printed.

31. The image forming apparatus as claimed in claim 29, wherein said correction means determines the predetermined correction timing based on a running time of the image forming apparatus measured by a timer.

32. The image forming apparatus as claimed in claim 29, wherein said correction means determines the predetermined correction timing based on conditions of use of the image forming apparatus.

33. The image forming apparatus as claimed in claim 32, wherein said correction means determines the predetermined correction timing based on at least one of a combination of the plurality of image bearing members used, a number of image bearing members used, and a resolution of the image bearing members.

34. The image forming apparatus as claimed in claim 29, wherein said correction means obtains the correction quantities based on an initial correction quantity prestored in said non-volatile memory means.

35. The image forming apparatus as claimed in claim 29, wherein said correction means stores the correction quantities in said non-volatile memory means for every condition of use of the image forming apparatus.

36. The image forming apparatus as claimed in claim 29, wherein said correction means stores a correction timing in said non-volatile memory means, and calculates a next correction timing based on a past correction timing and correction quantities read from said non-volatile memory means.

* * * * *